United States Patent
Takahashi

(10) Patent No.: US 12,216,022 B2
(45) Date of Patent: Feb. 4, 2025

(54) CHASSIS DYNAMOMETER SYSTEM WHICH CAN PREVENT A DECLINE IN RESPONSIVENESS

(71) Applicant: MEIDENSHA CORPORATION, Tokyo (JP)

(72) Inventor: Toshimichi Takahashi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/689,796

(22) PCT Filed: Sep. 5, 2022

(86) PCT No.: PCT/JP2022/033242
§ 371 (c)(1),
(2) Date: Mar. 6, 2024

(87) PCT Pub. No.: WO2023/033168
PCT Pub. Date: Mar. 9, 2023

(65) Prior Publication Data
US 2024/0264042 A1   Aug. 8, 2024

(30) Foreign Application Priority Data
Sep. 6, 2021 (JP) .................... 2021-144779

(51) Int. Cl.
*G01M 17/007* (2006.01)
(52) U.S. Cl.
CPC ................ *G01M 17/0072* (2013.01)
(58) Field of Classification Search
CPC ............................... G01M 17/0072
See application file for complete search history.

(56) References Cited

U.S. PATENT DOCUMENTS

| 6,257,054 B1* | 7/2001 | Rostkowski ............ G01L 5/282 73/123 |
| 2021/0010903 A1* | 1/2021 | Akiyama .......... G01M 17/0072 |

FOREIGN PATENT DOCUMENTS

| JP | H04-285838 A | 10/1992 |
| JP | 2007-248095 A | 9/2007 |
| JP | 2007-285903 A | 11/2007 |

(Continued)

*Primary Examiner* — Eric S. McCall
*Assistant Examiner* — Timothy P Graves
(74) *Attorney, Agent, or Firm* — MUNCY, GEISSLER, OLDS & LOWE, P.C.

(57) ABSTRACT

This control device 6 comprises a uniform-speed synchronization control unit 63 for generating a synchronization correction input Fd for front-wheel and rear-wheel dynamometers so that a difference between front and rear speeds is eliminated, a load balance computation unit 62 for generating a front-wheel load balance correction input Ffil_f and a rear-wheel load balance correction input Ffil_r, a front-wheel torque current command generation unit 64f for generating a front-wheel torque current command on the basis of the inputs Ffil_f and Fd, and a rear-wheel torque current command generation unit 64r for generating a rear-wheel torque current command on the basis of the inputs Ffil_r and Fd. The load balance computation unit 62 causes the inputs Ffil_f and Ffil_r to change independently of one another, raises the input Ffil_f a rear-wheel drive force Fvr increases, and raises the input Ffil_r as a rear-wheel drive force Fvf increases.

10 Claims, 9 Drawing Sheets

(56) References Cited

FOREIGN PATENT DOCUMENTS

| JP | 2010-197129 A | 9/2010 |
|----|---------------|--------|
| JP | 6525076 B1    | 6/2019 |

* cited by examiner

CHASSIS DYNAMOMETER SYSTEM WHICH CAN PREVENT A DECLINE IN RESPONSIVENESS

TECHNICAL FIELD

The present invention relates to a control device for a dynamometer system. In more detail, it relates to a control device for a chassis dynamometer system including a plurality of driven members on which the front-rear wheels or left-right wheels of a vehicle are individually placed and a plurality of dynamometers coupled to each driven member.

BACKGROUND ART

In vehicle testing such as durability testing, exhaust purification performance evaluation testing and fuel economy measurement testing, a chassis dynamometer system can be used. The chassis dynamometer system includes rollers on which the wheels of the vehicle serving as the testing target are placed, and a dynamometer coupled to these roller, and reproduces conditions similar to actual travel conditions, by imparting travel resistance generating during actual travel such as rolling resistance and inertia resistance to the vehicle traveling on the rollers using dynamometers and rollers.

As such a chassis dynamometer system, assuming to be mainly used on a so-called four-wheel drive vehicle which transfers drive force to the front and rear wheels of the four-wheel vehicle, a system has been proposed which drives a front-wheel roller on which the front wheels of the vehicle are placed and a rear-wheel roller on which the rear wheels are placed respectively by individual dynamometers (for example, refer to Patent Document 1).

In the case of a four-wheeled vehicle on an actual road surface traveling in a non-slip state, the speeds of the front wheels and rear wheels are equal. However, with the aforementioned such chassis dynamometer system for four-wheel drive vehicles, due to independently driving the front-wheel roller and rear-wheel roller without mechanically coupling, a difference may arise between the speeds of the front-wheel roller and the rear-wheel roller. For this reason, a chassis dynamometer system for four-wheel drive vehicles performs synchronization control such that makes the front-wheel roller and rear-wheel roller equal speed (for example, refer to Patent Document 2).

CITATION LIST

Patent Document

Patent Document 1: Japanese Unexamined Patent Application, Publication No. 2007-285903
Patent Document 2: Japanese Patent No. 6525076

DISCLOSURE OF THE INVENTION

Problems to be Solved by the Invention

With the control device for a dynamometer system described in Patent Document 2, by combining the input generated by an electric inertia controller and input generated by a synchronization controller, the front-rear wheels are controlled to equal speeds while configured so as not to impart oscillatory behavior to a speed difference of the front-rear wheels. More specifically, the synchronization controller determines the input to the front-rear dynamometers so as to eliminate the speed difference between the front-wheel speed and rear-wheel speed, and the electric inertia controller calculates an electric inertia resistance imparted to the vehicle via the front-rear rollers using generated drive force of the vehicle estimated by the drive force observer, and determines the input to the front-rear dynamometers using this electric inertia resistance.

However, since the electric inertia controller described in Patent Document 2 is determines the input to the front-rear dynamometers based on the ratio of the sum of the front-wheel mechanical inertia Mf and rear-wheel mechanical inertia Mr relative to the vehicle inertia Mv, in the case of the sum of the front-wheel mechanical inertia Mf and rear-wheel mechanical inertia Mr equaling the vehicle inertia Mv, the output from the electric inertia controller becomes 0, and only the synchronous controller will operate. For this reason, there is concern over the responsiveness declining when transient such as during acceleration and during braking in which the load balance of front-rear wheels of the vehicle serving as the test target differ.

The present invention has an object of providing a control device for a chassis dynamometer system which can prevent a decline in responsiveness when transient of the synchronization function to equalize the speed of two or more vehicle wheels.

Means for Solving the Problems

A control device (for example, the control device 6, 6A described later) according to a first aspect of the present invention defines as a control target a dynamometer system (for example, the chassis dynamometer system S, SA described later) that includes: a first driven member (for example, the front-wheel roller 1$f$, left-front wheel roller 1$fl$ and left-rear wheel roller 1$rl$ described later) and a second riven member (for example, the rear-wheel roller 1$r$, right-front wheel roller 1$fr$ and right-rear wheel roller 1$rr$ described later) on which a first wheel (for example, the front wheel Wf, left-front wheel Wfl and left-rear wheel Wrl described later) and second wheel (for example, the rear wheel Wr, right-front wheel Wfr and right-rear wheel Wrr described later) of a vehicle (for example, the vehicle V described later) are respectively placed, and driven by rotation of each; a first dynamometer (for example, the front wheel dynamometer 2$f$, left-front wheel dynamometer 2$fl$ and left-rear wheel dynamometer 2$rl$ described later) and a second dynamometer (for example, the rear wheel dynamometer 2$r$, right-front wheel dynamometer 2$fr$ and right-rear wheel dynamometer 2$rr$ described later) respectively coupled to the first and second driven members; a first speed sensor (for example, the front-wheel speed sensor 3$f$, left-front wheel speed sensor 3$fl$ and left-rear wheel speed sensor 3$rl$ described later) which detects a first speed of the first dynamometer; and a second speed sensor (for example, the rear-wheel speed sensor 3$r$, right-front wheel speed sensor 3$fr$ and right-rear wheel speed sensor 3$rr$ described later) which detects a second speed of the second dynamometer. The control device includes: an uniform-speed synchronization controller (for example, the uniform-speed synchronization controller 63, front-side uniform-speed synchronization controller 63$f$ and rear-side uniform-speed synchronization controller 63$r$ described later) which generates a synchronization correction input for the first dynamometer and the second dynamometer so that a speed difference between the first speed and the second speed is eliminated; a first drive force estimator (for example, the front-wheel drive force observer 61$f$, left-front wheel drive force observer 61*fl* and left-rear wheel drive force observer 61*rl* described later) which estimates a first drive force transferred from the first wheel to the first driven member; a second drive force estimator (for example, the rear-wheel drive force observer 61*r*, right-front wheel drive force observer 61*fr* and right-rear wheel drive force observer 61*rr* described later) which estimates a second drive force transferred from the second wheel to the second driven member; a load balance processor (for example, the load balance processor 63, front-side load balance processor 62*f* and rear-side load balance processor 62*r* described later) which generates a first load balance correction input for the first dynamometer, and a second load balance correction input for the second dynamometer, based on the first drive force and the second drive force; a first torque current command generator (for example, the front-wheel torque current command generator 64*f*, left-front wheel torque current command generator 64*fl* and left-rear wheel torque current command generator 64*rl* described later) which generates and inputs to the first dynamometer a first torque current command based on the first load balance correction input and the synchronization correction input; and a second torque current command generator (for example, the rear-wheel torque current command generator 64*r*, right-front wheel torque current command generator 64*fr* and right-rear wheel torque current command generator 64*rr* described later) which generates and inputs to the second dynamometer a second torque current command based on the second load balance correction input and the synchronization correction input, in which the load balance processor independently varies the first load balance correction input and the second load balance correction input, and raises the first load balance correction input as the second drive force increases, and raises the second load balance correction input as the first drive force increases.

According to a second aspect of the present invention, in this case, it is preferable for the load balance processor to calculate a first correction amount by multiplying a first ratio determined between 0 and 1 by a synthetic drive force obtained by summing the first drive force and second drive force, and generate the second load balance correction input by subtracting the first correction amount from the first drive force; and to calculate a second correction amount by multiplying a second ratio obtained by subtracting the first ratio from 1 by the synthetic drive force, and generate the first load balance correction input by subtracting the second correction amount from the second drive force.

According to a third aspect of the present invention, in this case, it is preferable for the first ratio to be a ratio of a first mechanical inertia combining the first driven member and the first dynamometer relative to a synthetic mechanical inertia combining the first driven member, the second driven member, the first dynamometer and the second dynamometer; and the second ratio to be a ratio of a second mechanical inertia combining the second driven member and the second dynamometer relative to the synthetic mechanical inertia.

According to a fourth aspect of the present invention, in this case, it is preferable for the control device to further include a main controller (for example, the main controller 65 described later) which generates a main control input based on any of a speed control algorithm, a torque control algorithm and a travel resistance control algorithm, in which the first torque current command generator generates the first torque current command, based on the first load balance correction input, the synchronization correction input and the main control input, and the second torque current command generator generates the second torque current command based on the second load balance correction input, the synchronization correction input and the main control input.

According to a fifth aspect of the present invention, in this case, it is preferable for the first wheel to be a front wheel (for example, the front wheel Wf described later) of the vehicle, and the second wheel to be a rear wheel (for example, the rear wheel Wr described later) of the vehicle.

According to a sixth aspect of the present invention, in this case, it is preferable for the first wheel to be a left wheel (for example, the left-front wheel Wfl and left-rear wheel Wrl described later) of the vehicle, and the second wheel to be a right wheel (for example, the right-front wheel Wfr and right-rear wheel Wrr described later) of the vehicle.

A control device (for example, the control device 6A, 6B described later) according to a seventh aspect of the present invention defines as a control target a dynamometer system (for example, the chassis dynamometer system SA described later) that includes: a left-front driven member (for example, the left-front wheel roller 1*fl* described later), right-front driven member (for example, the right-front wheel roller 1*fr* described later), left-rear driven member (for example, the left-rear wheel roller 1*fl* described later) and right-rear driven member (for example, the right-rear wheel roller 1*rr* described later) on which a left-front wheel (for example, the left-front wheel Wfl described later), right-front wheel (for example, the right-front wheel Wfr described later), left-rear wheel (for example, the left-rear wheel Wrl described later) and right-rear wheel (for example, the right-rear wheel Wrr described later) of a vehicle (for example, the vehicle V described later) are respectively placed, and are driven by rotation of each, a left-front dynamometer (for example, the left-front wheel dynamometer 2*fl* described later), right-front dynamometer (for example, the right-front wheel dynamometer 2*fr* described later), left-rear dynamometer (for example, the left-rear wheel dynamometer 2*rl* described later) and right-rear dynamometer (for example, the right-rear wheel dynamometer 2*rr* described later) are respectively coupled to the left-front driven member, the right-front driven member, the right-rear driven member and the right-rear driven member, a left-front speed sensor (for example, the left-front wheel speed sensor 3*fl* described later) which detects a left-front speed of the left-front dynamometer, a right-front speed sensor (for example, the right-front wheel speed sensor 3*fr* described later) which detects a right-front speed of the right-front dynamometer, a left-rear speed sensor (for example, the left-rear wheel speed sensor 3*rl* described later) which detects a left-rear speed of the left-rear dynamometer, and a right-rear speed sensor (for example, the right-rear wheel speed sensor 3*rr* described later) which detects a right-rear speed of the right-rear dynamometer. The control device includes: a front-side uniform-speed synchronization controller (for example, the front-side uniform-speed synchronization controller 63*f* described later) which generates a front-side synchronization correction input for the left-front dynamometer and the right-front dynamometer so that a speed difference between the left-front speed and the right-front speed is eliminated; a rear-side uniform-speed synchronization controller (for example, the rear-side uniform-speed synchronization controller 63*r* described later) which generates a rear-side synchronization correction input for the left-rear dynamometer and the right-rear dynamometer so that a speed difference between the left-rear speed and the right-rear speed is eliminated; a left-front drive force estimator (for example, the left-front wheel drive force observer 61*fl* described later) which estimates a left-front drive force transferred from the left-front wheel to the left-front driven member; a right-front drive force estimator (for example, the right-front wheel drive force observer 61fr described later) which estimates a right-front drive force transferred from the right-front wheel to the right-front driven member; a left-rear drive force estimator (for example, the left-rear wheel drive force observer 61rl described later) which estimates a left-rear drive force transferred from the left-rear wheel to the left-rear driven member; a right-rear drive force estimator (for example, the right-rear wheel drive force observer 61rr described later) which estimates a right-rear drive force transferred from the right-rear wheel to the right-rear driven member; a front-side load balance processor (for example, the front-side load balance processor 62f, 67f described later) which generates a first left-front load balance correction input for the left-front dynamometer and a first right-front load balance correction input for the right-front dynamometer, based on the left-front drive force and the right-front drive force; a rear-side load balance processor (for example, the rear-side load balance processor 62r, 67r described later) which generates a first left-rear load balance correction input for the left-rear dynamometer and a first right-rear load balance correction input for the right-rear dynamometer, based on the left-rear drive force and the right-rear drive force; a left-front torque current command generator (for example, the left-front wheel torque current command generator 64fl described later) which generates and inputs to the left-front dynamometer the left-front torque current command based on the first left-front load balance correction input and the front-side synchronization correction input; a right-front torque current command generator (for example, the right-front wheel torque current command generator 64fr described later) which generates and inputs to the right-front dynamometer the right-front torque current command based on the first right-front load balance correction input and the front-side synchronization correction input; a left-rear torque current command generator (for example, the left-rear wheel torque current command generator 64rl described later) which generates and inputs to the left-rear dynamometer the left-rear torque current command based on the first left-rear load balance correction input and the rear-side synchronization correction input; and a right-rear torque current command generator (for example, the right-rear wheel torque current command generator 64rr described later) which generates and inputs to the right-rear dynamometer the right-rear torque current command based on the first right-rear load balance correction input and the rear-side synchronization correction input, in which the front-side load balance processor independently varies the first left-front load balance correction input and the first right-front load balance correction input, and raises the first left-front load balance correction input as the right-front drive force increases, and raises the first right-front load balance correction input as the left-front drive force increases, and the rear-side load balance processor independently varies the first left-rear load balance correction input and the first right-rear load balance correction input, and raises the first left-rear load balance correction input as the right-rear drive force increases, and raises the first right-rear load balance correction input as the left-rear drive force increases.

According to an eighth aspect of the present invention, it is preferable for the control device to further include: a front-rear uniform-speed synchronization controller (for example, the front-rear uniform-speed synchronization controller 63fr described later) which generates a front-rear synchronization correction input for the left-front dyna-mometer, right-front dynamometer, left-rear dynamometer and right-rear dynamometer so that a speed difference between a front-side average speed which is an average of the left-front speed and the right-front speed, and a rear-side average speed, which is an average of the left-rear speed and the right-rear speed, is eliminated; and a front-rear load balance processor (for example, the front-rear load balance processor 68 described later) which generates a second left-front load balance correction input for the left-front dynamometer, a second right-front load balance correction input for the right-front dynamometer, a second left-rear load balance correction input for the left-rear dynamometer, and a second right-rear load balance correction input for the right-rear dynamometer, in which the left-front torque current command generator generates the left-front torque current command based on the first left-front load balance correction input, the second left-front load balance correction input, the front-side synchronization correction input, and the front-rear synchronization correction input, the right-front torque current command generator generates the right-front torque current command based on the first right-front load balance correction input, the second right-front load balance correction input, the front-side synchronization correction input, and the front-rear synchronization correction input, the left-rear torque current command generator generates the left-rear torque current command based on the first left-rear load balance correction input, the second left-rear load balance correction input, the rear-side synchronization correction input, and the front-rear synchronization correction input, the right-rear torque current command generator generates the right-rear torque current command based on the first right-rear load balance correction input, the second right-rear load balance correction input, the rear-side synchronization correction input, and the front-rear synchronization correction input, and the front-rear load balance processor independently varies the second left-front load balance correction input, the second right-front load balance correction input, the second left-rear load balance correction input and the second right-rear load balance correction input, and raises the second left-front load balance correction input and the second right-front load balance correction input, as a rear-side synthetic drive force obtained by summing the left-rear drive force and the right-rear drive force increases, and raises the second left-rear load balance correction input and the second right-rear load balance correction input as a front-side synthetic drive force obtained by summing the left-front drive force and the right-front drive force increases.

According to a ninth aspect of the present invention, in this case, it is preferable for the front-rear load balance processor: to calculate a front-side correction amount by multiplying a front-side ratio determined between 0 and 1 by the front-side synthetic drive force, and generate the second left-rear load balance correction input and the second right-rear load balance correction input by subtracting the front-side correction amount from the front-side synthetic drive force; and to calculate a rear-side correction amount by multiplying a rear-side ratio obtained by subtracting the front-side ratio from 1 by the rear-side synthetic drive force, and generates the second left-front load balance correction input and second right-front load balance correction input by subtracting the rear-side correction amount from the rear-side synthetic drive force.

According to a tenth aspect of the present invention, in this case, it is preferable for the front-rear load balance processor: to generate the second left-front load balance correction input by multiplying a left-front ratio determined between 0 and 1 by a drive force obtained by subtracting the rear-side correction amount from the rear-side synthetic drive force; generate the second right-front load balance correction input by multiplying a right-front ratio obtained by subtracting the left-front ratio from 1 by a drive force obtained by subtracting the rear-side correction amount from the rear-side synthetic drive force; generate the second left-rear load balance correction input by multiplying a left-rear determined between 0 and 1 by a drive force obtained by subtracting the front-side correction amount from the front-side synthetic drive force; and generate the second right-rear load balance correction input by multiplying a right-rear ratio obtained by subtracting the left-rear ratio from 1 by a drive force obtained by subtracting the front-side correction amount from the front-side synthetic drive force.

Effects of the Invention (1) The control device for a dynamometer system includes: the unform-speed synchronization controller which generates a synchronization correction input so that the speed difference between the first and second speeds is eliminated; the load balance processor which generates the first and second load balance correction inputs based on the first and second rive forces estimated by the first and second drive force estimators; the first torque current command generator which generates the first torque current command for the first dynamometer based on the first load balance correction input and the synchronization correction input; and the second torque current command generator which generates the second torque current command for the second dynamometer based on the second load balance correction input and the synchronization correction input. In particular, in the control device according to the present invention, the load balance processor independently varies the first and second load balance correction input, and raises the first load balance correction input as the second drive force increase, and raises the second load balance correction input as the first drive force increases. Since it is thereby possible to independently vary the first and second load balance correction inputs respectively, so that the speed difference decreases between the first speed and second speed decreases when transient during which there is a tendency for the difference between the first drive force and second drive force increasing, it is possible to prevent a decline in responsiveness when transient compared to conventional.

(2) In the present invention, the load balance processor calculates the first correction amount by multiplying the first ratio between 0 and 1 by the synthetic drive force, and generates the second load balance correction input by subtracting the first correction amount from the first drive force. In addition, the load balance processor calculates the second correction amount by multiplying the second ratio obtained by subtracting the first ratio from 1 by the synthetic drive force, and generates the first load balance correction input by subtracting the second correction amount from the second drive force. It is thereby possible to adjust the first and second load balance correction input to an appropriate magnitude, in response to the synthetic drive force and the load balance of the first and second drive forces constituting this synthetic drive force.

(3) In the present invention, the first ratio is defined as a ratio of the first mechanical inertia combining the first driven member and the first dynamometer relative to the synthetic mechanical inertia combining the first and second driven members and the first and second dynamometers, and the second ratio is defined as the second mechanical inertia combining the second driven member and the second dynamometer relative to the synthetic mechanical inertia. It is thereby possible to adjust the first and second load balance correction inputs to the appropriate magnitude, in response to the synthetic drive force, the load balance of the first and second drive forces, and the balance of the first and second mechanical inertias.

(4) In the present invention, the main controller generates the main control input based on any of the speed control algorithm, torque control algorithm and travel resistance control algorithm, the first torque current command generator generates the first torque current command based on the first load balance correction input, synchronization correction input and main control input, and the second torque current command generator generates the second torque current command based on the second load balance correction input, synchronization correction input and main control input. It is thereby possible to easily incorporate a synchronization function maintaining at least two wheels at uniform speed in the speed control, torque control, travel resistance control, etc. by the main controller.

(5) In the present invention, the first wheel is established as a front wheel, and the second wheel is established as a rear wheel. It is thereby possible to control the dynamometer system so that the front wheel and rear wheel become uniform speed.

(6) In the present invention, the first wheel is established as a left wheel, and the second wheel is established as a right wheel. It is thereby possible to control the dynamometer system so that the left wheel and right wheel become uniform speed.

(7) A control device for a dynamometer system includes: a front-side uniform-speed synchronization corrector which generates a front-side synchronization correction input so that a speed difference between the left-front and right-front speeds is eliminated; a rear-side uniform-speed synchronization corrector which generates a left-rear and rear-side synchronization correction input so that a speed difference between the left-rear and right-rear speed is eliminated; a front-side load balance processor which generates a first left-front and first right-front load balance correction input based on the estimated left-front and right-front drive forces; a rear-side load balance processor which generates the first left-rear and first right-rear load balance correction input based on the estimated left-rear and right-rear drive force; a left-rear torque current command generator which generates the left-front torque current command based on the first left-front load balance correction input and the front-side synchronization correction input; a right-front torque current command generator which generates the right-front torque current command based on the first right-front load balance correction input and front-side synchronization correction input; a left-rear torque current command generator which generates the left-rear torque current command based on the first left-rear load balance correction input and rear-side synchronization correction input; and a right-rear torque current command generator which generates the right-rear torque current command based on the first right-rear load balance correction input and rear-side synchronization correction input. In particular, in the control device according to the present invention, the front-side load balance processor independently varies the first left-front and first right-front load balance correction input, and raises the first left-front load balance correction input as the right-front drive force increases, and raises the first right-front load balance correction input as the left-front drive force increases. In addition, the rear-side load balance processor independently varies the first left-rear and first right-rear load balance correction inputs, and raises the first left-rear load balance correction input as the right-rear drive force increases, and raises the first-rear load balance correction input as the left-rear drive force increases. Since it is thereby possible to independently vary the first left-front, first right-front, first left-rear and first right-rear load balance correction inputs respectively, so that a speed difference between left and right wheels becomes smaller, in cases such that a difference in drive forces between left and right wheels increases on a front-wheel side or rear-wheel side, it is possible to prevent a decline in responsiveness when transient compared to conventional.

(8) The control device for a dynamometer system further includes: a front-rear uniform-speed synchronization controller which generates a front-rear synchronization correction input so that a speed difference between the front-side average speed and rear-side average speed is eliminated, and a front-rear load balance processor which generates a second left-front, second right-front, second left-rear and second right-rear load balance correction inputs based on the left-front, right-front, left-rear and right-rear drive forces. In addition, the front-rear load balance processor independently varies the second left-front, second right-front second left-rear and second right-rear load balance correction inputs, and raises the second left-front and second right-front load balance correction inputs as the rear-side synthetic drive force increases, and raises the second left-rear and second right-rear load balance correction inputs as the front-side synthetic drive force increases. It is thereby possible to prevent a decline in responsiveness when transient of the synchronization function for maintaining the speeds of all front-rear left-right wheels at uniform speed.

(9) The front-rear load balance processor calculates the front-side correction amount by multiplying the front-side ratio between 0 and 1 by the front-side synthetic drive force, and generates the second left-rear and second right-rear load balance correction inputs by subtracting the front-side correction amount from the front-side synthetic drive force. In addition, the front-rear load balance processor calculates the rear-side correction amount by multiplying the rear-side ratio obtained by subtracting the front-side ratio from 1 by the rear-side synthetic drive force, and generates the second left-front and second right-front load balance correction input by subtracting the rear-side correction amount from the rear-side synthetic drive force. It is thereby possible to adjust the second left-front and second right-front load balance correction inputs and second left-rear and second right-rear load balance correction inputs to appropriate magnitudes, in response to the front-side synthetic drive force and the rear-side synthetic drive force.

(10) The front-rear load balance processor generates the second left-front load balance correction input by multiplying the left-front ratio between 0 and 1 by the drive force obtained by subtracting the rear-side correction amount from the rear-side synthetic drive force; generates the second right-front load balance correction input by multiplying the left-front ratio from 1 by the drive force obtained by subtracting the rear-side correction amount from the rear-side synthetic drive force; generates the second left-rear load balance correction input by multiplying the left-rear ratio between 0 and 1 by the drive force obtained by subtracting the front-side correction amount from the front-side synthetic drive force; and generates the second right-rear load balance correction input by multiplying the right-rear ratio obtained by subtracting the left-rear ratio) from 1 by the drive force obtained by subtracting the front-side correction amount from the front-side synthetic drive force. It is thereby possible to adjust the second left-front, second right-front, second left-rear and second right-rear load balance correction inputs to the appropriate magnitude, in response to the front-side synthetic drive force, the load balance of the left-front and right-front drive forces constituting this front-side synthetic drive force, the rear-side synthetic drive force, and the load balance of the left-rear and right-rear drive forces constituting this rear-side synthetic drive force.

PREFERRED MODE FOR CARRYING OUT THE INVENTION

First Embodiment

Figure 1:
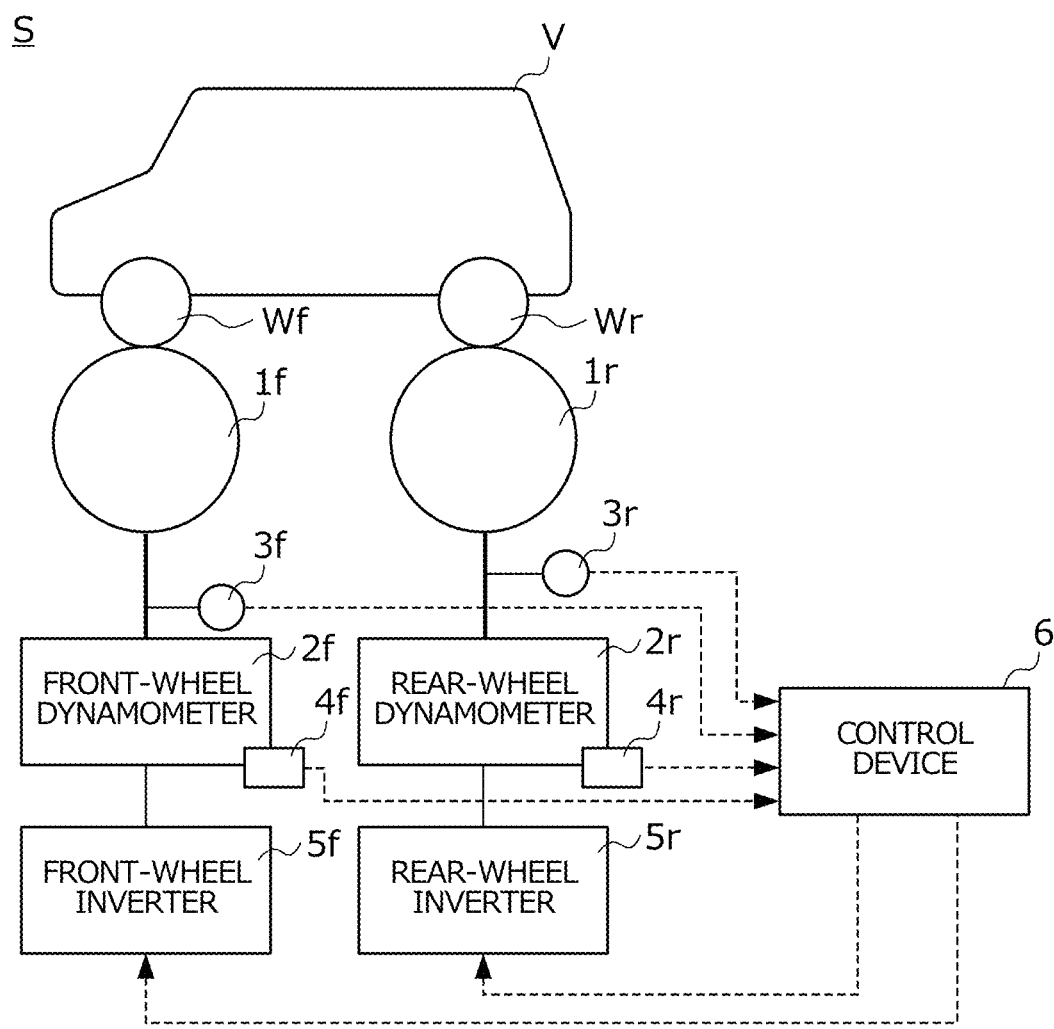
FIG. 1 is a view showing the configuration of a dynamometer system and control device thereof according to a first embodiment of the present invention.

Hereinafter, a first embodiment of the present invention will be explained while referencing the drawings. FIG. 1 is a view showing the configuration of a dynamometer system S and control device 6 thereof according to the present embodiment. A test target vehicle V of the dynamometer system S is a four-wheel drive (4WD) vehicle which separates and transmits the power thereof to the front wheels Wf and rear wheels Wr. The test target vehicle V may be established as a front-wheel drive (FWD) vehicle or rear-wheel drive (RWD) vehicle.

The dynamometer system S includes: a front-wheel roller $1f$ and rear-wheel roller $1r$ on which the front wheels Wf and rear wheels Wr of the vehicle V are respectively placed, and rotate following rotation of each; a front-wheel dynamometer $2f$ and rear-wheel dynamometer $2r$ connected coaxially to these rollers $1f$, $1r$, respectively; a front-wheel speed sensor $3f$ and rear-wheel speed sensor $3r$ respectively detecting the rotation speeds of the dynamometers $2f$, $2r$; a front-wheel torque sensor $4f$ and rear-wheel torque sensor $4r$ respectively detecting the torque of the dynamometers $2f$, 2r; a front-wheel inverter 5f and rear-wheel inverter 5r supplying power to the dynamometer 2f, 2r, respectively; and a control device 6 which generates, and inputs to the inverts 5f, 5r, front wheel and rear wheel torque current command signals corresponding to commands for torque to generate by the dynamometers 2f, 2r by using the outputs of the speed sensors 3f, 3r, the torque sensors 4f, 4r, etc.

Figure 2:
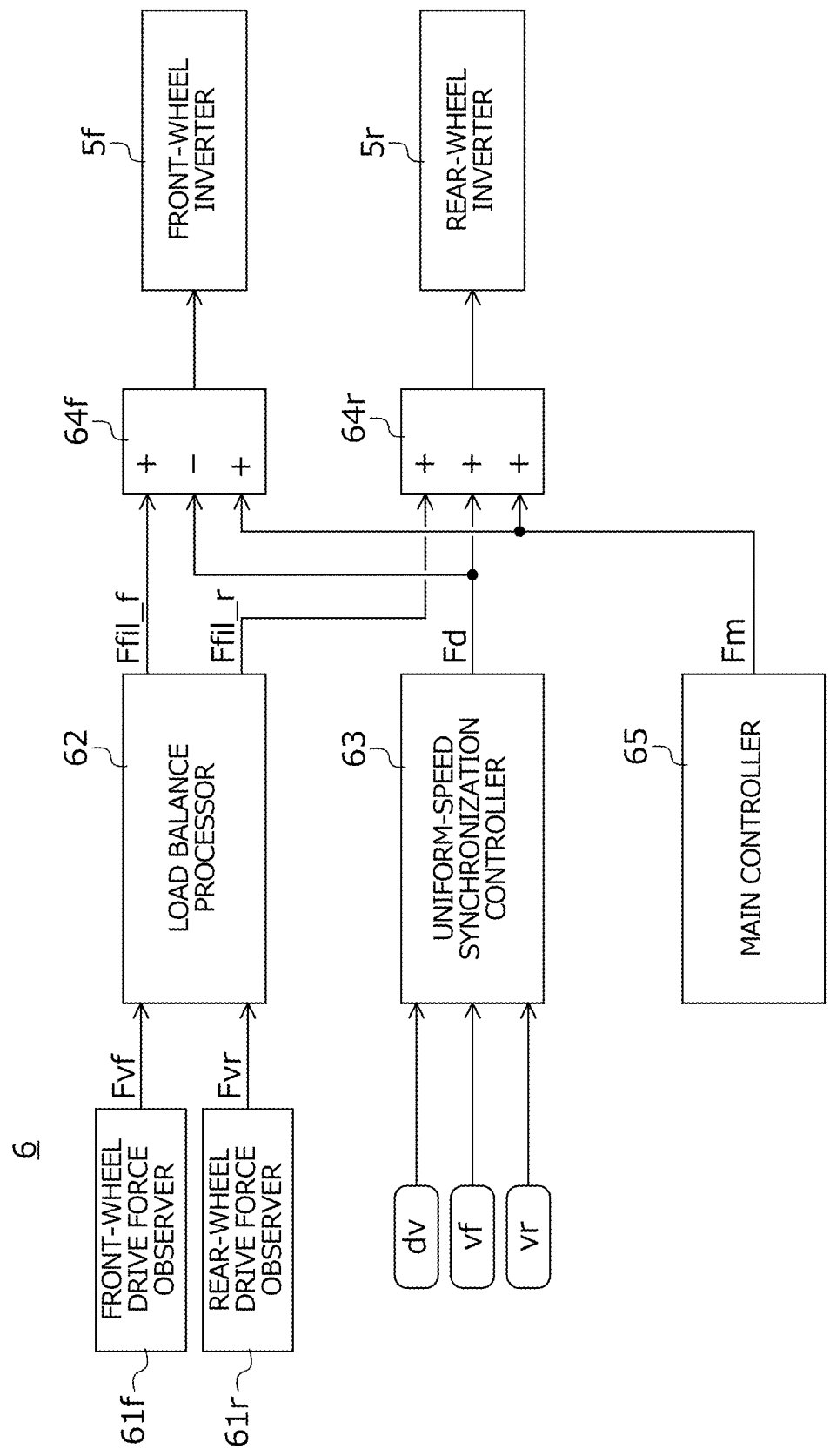
FIG. 2 is a view showing the configuration of the control device.

FIG. 2 is a view showing the configuration of the control device 6. The control device 6 includes a front-wheel drive force observer 61f, rear-wheel drive force observer 61r, load balance processor 62, uniform-speed synchronization controller 63, front-wheel torque current command generator 64f, rear-wheel torque current command generator 64r, and main controller 65.

The front-wheel drive force observer 61f estimates a front-wheel drive force Fvf (N) corresponding to the drive force transmitted from the front wheels of the vehicle to the front wheel roller, by using the front-wheel speed vf (m/s) detected by the front-wheel speed sensor, and front-wheel dynamometer torque detected by the front-wheel torque sensor. More specifically, the front-wheel drive force observer 61f, for example, estimates a front-wheel drive force Fvf transmitting from the front wheels of the vehicle to the front wheel roller, by using a model of a mechanical system configured from the front wheel roller on which the front wheels are placed, and the front wheel dynamometer coupled with this front wheel roller via a shaft.

The rear-wheel drive force observer 61r estimates the rear-wheel drive force Fvr (N) corresponding to the drive force transmitted from the rear wheels of the vehicle to the rear wheel roller, by using the rear-wheel speed Vr (m/s) detected by the rear-wheel speed sensor, and the rear-wheel dynamometer torque detected by the rear-wheel torque sensor. More specifically, the rear-wheel drive force observer 61r, for example, estimates the rear-wheel drive force Fvr transmitted from the rear wheels of the vehicle to the rear wheel roller, by using a model of a mechanical system configured by the rear wheel roller on which the rear wheels are placed, and the rear wheel dynamometer coupled with this rear wheel roller via a shaft.

The uniform-speed synchronization controller 63 generates the synchronization correction input Fd (N) for the front wheel and rear wheel dynamometers, using the front wheel speed vf and rear wheel speed vr so that the speed difference (vf−vr) is eliminated. More specifically, the uniform-speed synchronization controller 63 defines, as the synchronization correction input Fd, the output obtained by calculating a deviation input ev by subtracting the speed difference (vf−vr) from a predetermined speed difference command dv, and inputting this deviation input ev to a transfer function Gd(s) defined by the following Formula (1) using predetermined synchronization control gains Kp, Ti. It should be noted that, in the following Formula (1), "s" is a Laplacian operator. In addition, in the following Formula (1), the values of the synchronization control gains Kp, Ti are determined so that poles of the denominator polynomial of the transfer function from the synthetic drive force Fv from combining the front wheel drive force Fvf and rear wheel drive force Fvr until the speed difference (vf−vr), similarly to the synchronization controller 63 described in Japanese Patent No. 6525076 by the present applicants.

$$Gd(s) = Kp \cdot \frac{Ti \cdot s + 1}{Ti \cdot s} \quad (1)$$

Herein, speed difference command dv corresponds to a command value for the speed difference (vf−vr) of the front wheel speed vf and rear wheel speed vr. Hereinafter, a case of the value of the speed difference command dv being set to 0 in order to perform control to make this speed difference 0 will be explained; however, the present invention is not limited thereto. For example, in the case of performing testing of the clutch, testing of differential gears, etc., a speed difference may be intentionally provided to the front wheel speed and rear wheel speed (or left wheel speed and right wheel speed). Therefore, in the case of providing a speed difference intentionally in this way, the value of this speed difference command dv is set to a value other than 0.

The load balance processor 62, based on the front wheel drive force Fvf and rear wheel drive force Fvr estimated by the drive force observers 61f, 61r, generates the front-wheel load balance correction input Ffil_f and rear-wheel load balance correction input Ffil_r for the front wheel dynamometer, following the sequence explained below while referencing FIG. 3.

Figure 3:
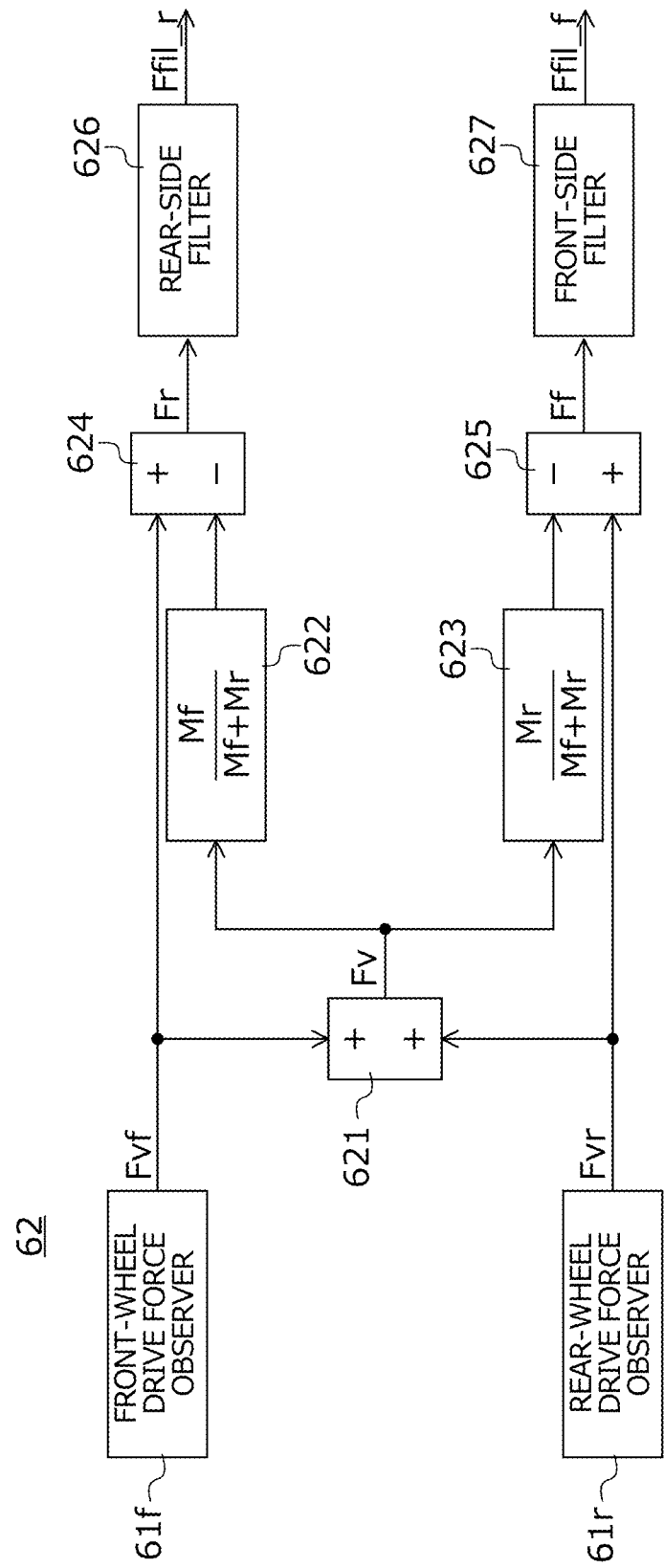
FIG. 3 is a view for explaining a sequence of generating a front wheel and rear wheel load balance correction input in a load balance processor.

FIG. 3 is a view for explaining the sequence of generating the load balance correction inputs Ffil_f, Ffil_r in the load balance processor 62.

The load balance processor 62 includes: a synthetic drive force processor 621, forward mechanical inertia ratio multiplier 622, rear mechanical inertia ratio multiplier 623, rear input processor 624, forward input processor 625, rear-side filter 626, and front-side filter 627.

The synthetic drive force processor 621 calculates the synthetic drive force Fv (N) by adding the front wheel drive force Fvf and rear wheel drive force Fvr (Fv=Fvf+Fvr).

The front-side mechanical inertia ratio multiplier 622 calculates the front-side correction amount Fv·Cf by multiplying the front-side mechanical inertia ratio Cf determined from 0 to 1 by the synthetic drive force Fv. Herein, front-side mechanical inertia ratio Cf is a ratio of the front-side mechanical inertia Mf relative to the synthetic mechanical inertia Mf+Mr, which is the sum of the front-side mechanical inertia Mf (kg) combining the front wheel roller and front wheel dynamometer, and the rear mechanical inertia Mr (kg) combining the rear wheel roller and rear wheel dynamometer (Cf=Mf/(Mf+Mr)).

The rear mechanical inertia ratio multiplier 623 calculates the rear-side correction amount Fv·Cr by multiplying the rear-side mechanical inertia ratio Cr obtained by subtracting the front-side mechanical inertia ratio Cf from 1, by the synthetic drive force Fv. Therefore, the sum of the front-side correction amount Fv·Cf and rear-side correction amount Fv·Cr always becomes the synthetic drive force Fv. Herein, the rear-side mechanical inertia ratio Cr is the ratio of the rear-side mechanical inertia Mr relative to the synthetic mechanical inertia Mf+Mr (Cr=Mr/(Mf+Mr)).

The rear-side input processor 624 calculates the rear-wheel load balance correction input Fr by subtracting the front-side correction amount Fv·Cf calculated by the front-side mechanical inertia ratio multiplier 622 from the front-wheel drive force Fvf (Fr=Fvf−Fv·Cf).

The front-side input processor 625 calculates the front-wheel load balance correction input Ff by subtracting the rear-side correction amount Fv·Cr calculated by the rear-side mechanical inertia ratio multiplier 623 from the front-wheel drive force Fvf (Fr=Fvr−Fv·Cr).

The rear-side filter 626 is a low-pass filter which removes noise from the output Fr of the rear-side input processor 624, by damping a component larger than a predetermined cut-off frequency from the output Fr of the rear-side input processor 624, and passing a component smaller than this cut-off frequency, and is represented by any transfer function PFr(s) having a relative order of at least first order. The output Ffil_r of the rear-side filter 626 is inputted to the rear-wheel torque current command generator 64*r*. Hereinafter, the output Fr of the rear-side input processor 624, and the output Ffil_r of the rear-side filter 626 represented by the following Formula (2) are both referred to as rear-wheel load balance correction input.

$$Ffil\_r = PFr(s) \cdot (Fvf - (Fv \cdot Cf)) \qquad (2)$$

The forward-side filter 627 is a low-pass filter that removes noise from the output Fr of the front-side input processor 625, by damping a larger component than a predetermined cutoff frequency from the output Ff of the front-side input processor 625, and passing a smaller component than this cutoff frequency, and is represented by any transfer function PFf(s) having a relative order of at least first order. The output Ffil_f of the front-side filter 627 is input to the front-wheel filter current command generator 64*f*. Hereinafter, the output Ff of the front-side input processor 625 and the output Ffil_f of the front-side filter 627 represented by the following Formula (3) are both referred to as front-wheel load balance correction input.

$$Ffil\_f = PFf(s) \cdot (Fvr - (Fv \cdot Cf)) \qquad (3)$$

In the above way, the load balance processor 62 independently varies the front-wheel load balance correction input Ffil_f and rear-wheel load balance correction input Ffil_r, raises the front-wheel load balance correction input Ffil_f as the rear-wheel drive force Fvr increases, and raises the rear-wheel load balance correction input Ffil_r as the front-wheel drive force Fvf increases.

Referring back to FIG. 2, the main controller 65 generates a main control input Fm for the front wheel and rear wheel dynamometers based on any of a speed control algorithm, torque control algorithm, and a travel resistance control algorithm, and inputs this to the torque current command generators 64*f*, 64*r*.

The front-wheel torque current command generator 64*f* generates a front-wheel torque current command signal based on the main control input Fm, front-wheel load balance correction input Ffil_f, and synchronization correction input Fd, and inputs this to the front-wheel inverter 5*f*. More specifically, the front-wheel torque current command generator 64*f* generates the front-wheel torque current command signal, by subtracting the synchronization correction input Fd from the sum of the main control input Fm, and front-wheel load balance correction input Ffil_f.

The rear-wheel torque current command generator 64*r* generates the rear-wheel torque current command signal based on the main control input Fm, rear-wheel load balance correction input Ffil_r, and synchronization correction input Fd, and inputs this to the rear-wheel inverter 5*r*. More specifically, the rear-wheel torque current command generator 64*r* generates the rear-wheel torque current command signal, by adding the main control input Fm, rear-wheel load balance correction input Ffil_r, and synchronization correction input Fd.

Figure 4:
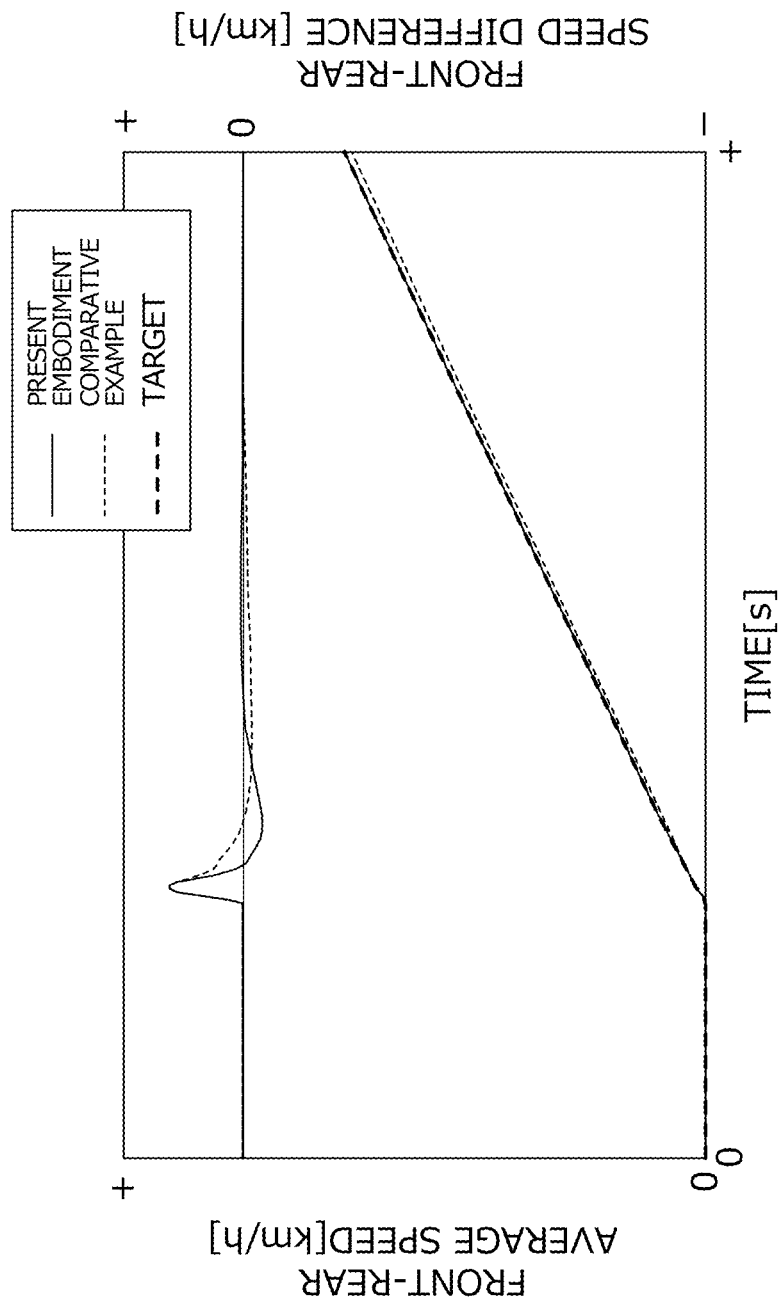
FIG. 4 is a graph comparing a vehicle speed and front/rear acceleration speed difference during acceleration between the control device according to the present embodiment, and a control device according to a comparative example.

FIG. 4 is a view comparing the vehicle speed and front-rear speed difference during acceleration between the control device 6 according to the present embodiment and the control device according to a comparative example. The lower part of FIG. 4 shows the front-rear average vehicle speed, and the upper part of FIG. 4 shows the front-rear speed difference. Herein, control device according to the comparative example refers to a case of defining the output of the load balance processor 62 as 0 in the control device 6 according to the present embodiment, and generating the front-wheel and rear-wheel torque current command signals only by the uniform-speed synchronization controller 63.

As shown in the upper part of FIG. 4, in the front-rear speed difference produced during acceleration, the control device 6 according to the present embodiment converges faster than the control device according to the comparative example. In addition, as shown in the lower part of FIG. 4, for the front-rear average vehicle speed, the control device 6 according to the present embodiment approaches the target indicated by the bold broken line, i.e. vehicle speed in the case of defining the front/rear vehicle speed difference as 0, more than the control device according to the comparative example. The above clarifies that the responsiveness of synchronization function during transient times can be improved by the load balance processor 62.

Second Embodiment

Next, a second embodiment of the present invention will be explained while referencing the drawings. It should be noted that, in the following explanation, the same reference symbols will be attached to configuration which are the same as the chassis dynamometer system S and control device 6 according to the first embodiment, and detailed explanations thereof will be omitted.

Figure 5:
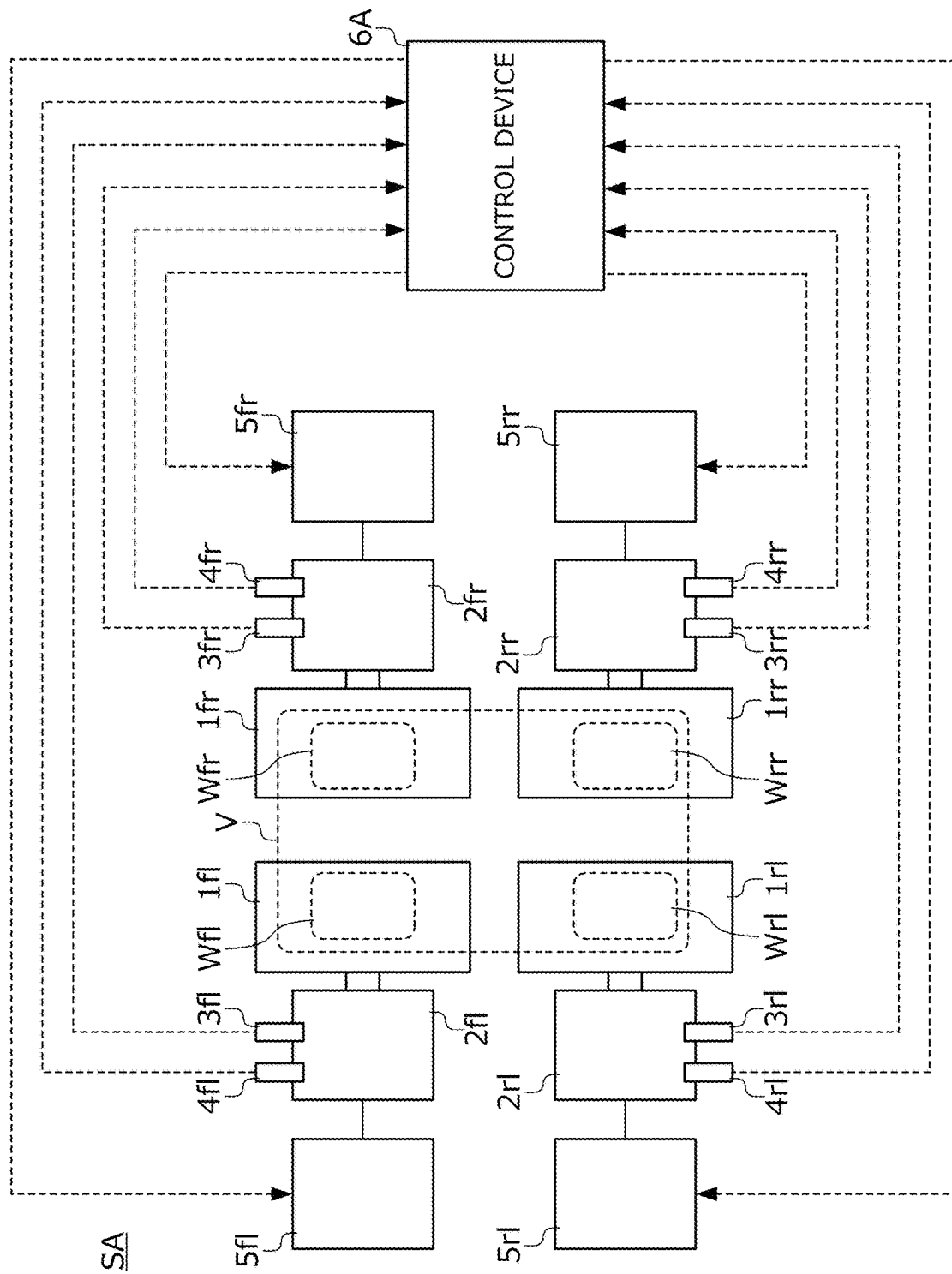
FIG. 5 is a view showing a dynamometer system and control device thereof according to a second embodiment of the present invention.

FIG. 5 is a view showing the configurations of a chassis dynamometer system SA and control device 6A thereof according to the present embodiment.

The chassis dynamometer system SA includes: a left-front wheel roller 1*fl*, right-front wheel roller 1*fr*, left-rear wheel roller 1*rl* and right-rear wheel roller 1*rr* on which a left-front wheel Wfl, right-front wheel Wfr, left-rear wheel Wrl and right-rear wheel Wrr of a vehicle V are placed, and rotate following the rotation of each; a left-front wheel dynamometer 2*fl*, right-front wheel dynamometer 2*fr*, left-rear wheel dynamometer 2*rl* and right-rear wheel dynamometer 2*rr* coupled coaxially with these rollers 1*fl*, 1*fr*, 1*rl* and 1*rr* respectively; a left-front wheel speed sensor 3*fl*, right-front wheel speed sensor 3*fr*, left-rear wheel speed sensor 3*rl* and right-rear wheel speed sensor 3*rr* which respectively detect the rotation speeds of these dynamometers 2*fl*, 2*fr*, 2*rl* and 2*rr*; a left-front wheel torque sensor 4*fl*, right-front wheel torque sensor 4*fr*, left-rear wheel torque sensor 4*rl* and right-rear wheel torque sensor 4*rr* which respectively detect the torques of these dynamometers 2*fl*, 2*fr*, 2*rl* and 2*rr*; a left-front wheel inverter 5*fl*, right-front wheel inverter 5*fr*, left-rear wheel inverter 5*rl* and right-rear wheel inverter 5*rr* which respectively supply electric power to these dynamometers 2*fl*, 2*fr*, 2*rl* and 2*rr*; and a control device 6A which generates a left-front wheel, right-front wheel, left-rear wheel and right-rear wheel torque current command signal corresponding to commands for the torques of the dynamometers 2*fl*, 2*fr*, 2*rl* and 2*rr* using the outputs of the speed sensors, 3*fl*, 3*fr*, 3*rl* and 3*rr* and torque sensors 4*fl*, 4*fr*, 4*rl* and 4*rr*, etc. and inputs these to each of the inverters 5*fl*, 5*fr*, 5*rl* and 5*rr*.

Figure 6:
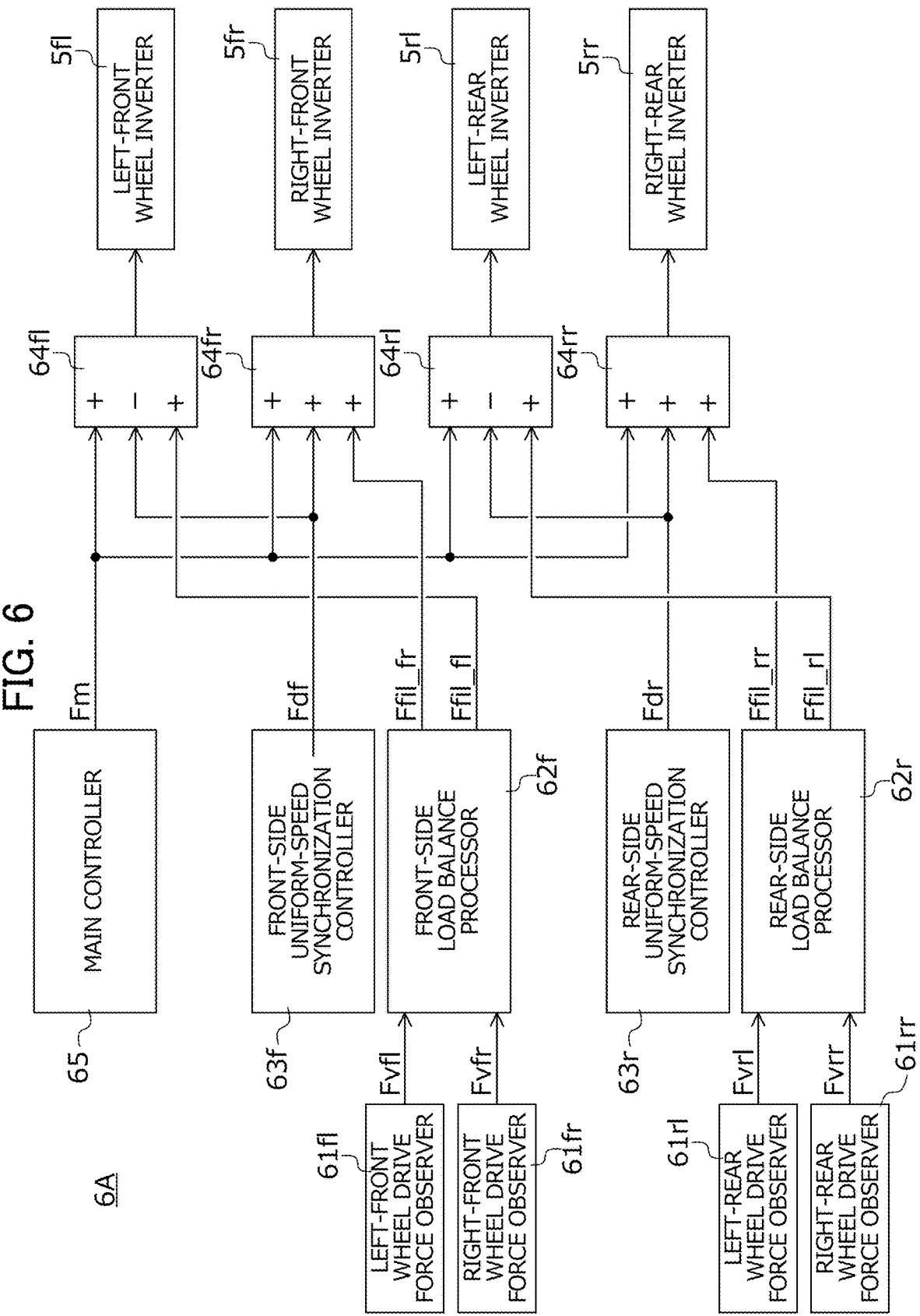
FIG. 6 is a view showing the configuration of the control device.

FIG. 6 is a view showing the configuration of the control device 6A. The control device 6A includes: a left-front wheel drive force observer 61*fl*, right-front wheel drive force observer 61*fr*, left-rear wheel drive force observer 61*rl*, right-rear wheel drive force observer 61*rr*, front-side load balance processor 62*f*, rear-side load balance processor 62*r*, front-side uniform-speed synchronization controller 63*f*, rear-side uniform-speed synchronization controller 63*r*, left-front wheel torque current command generator 64*fl*, right-front wheel torque current command generator 64*fr*, left-rear wheel torque current command generator 64*rl*, right-rear wheel torque current command generator 64*rr*, and main controller 65.

Each drive force observer 61*fl*, 61*fr*, 61*rl*, 61*rr* respectively estimates the left-front wheel drive force Fvfl (N) corresponding to the drive force transmitted from the left-front wheel to the left-front wheel roller, the right-front wheel drive force Fvfr (N) corresponding to the drive force transmitted from the right-front wheel to the right-front wheel roller, the left-rear wheel drive force Fvrl (N) corresponding to the drive force transmitted from the left-rear wheel to the left-rear wheel roller, and the right-rear wheel drive force Fvrr (N) corresponding to the drive force transmitted from the right-rear wheel to the right-rear wheel roller, by using the speeds respectively detected by each of the speed sensors 3*fl*, 3*fr*, 3*rl*, 3*rr*, and the dynamometer torques detected by each of the torque sensors 4*fl*, 4*fr*, 4*rl*, 4*rr*. It should be noted that the sequence of estimating the drive forces Fvfl, Fvfr, Fvrl, Fvrr in each drive force observer 61*fl*, 61*fr*, 61*rl*, 61*rr* is the same as the drive force observers 61*f*, 61*r* according to the first embodiment, and a detailed explanation thereof will be omitted.

The front-side uniform-speed synchronization controller 63*f* generates the front-side synchronization correction input Fdf (N) for the left-front wheel and right-front wheel dynamometer so that the speed difference between the left-front wheel speed and right-front wheel speed is eliminated. In addition, the rear-side uniform-speed synchronization controller 63*r* generates a rear-side synchronization correction input Fdr (N) for the left-rear wheel and right-rear wheel dynamometer so that the speed difference between the left-rear wheel speed and right-rear wheel speed is eliminated. It should be noted that the sequence of generating the synchronization correction inputs Fdf, Fdr in each of the uniform-speed synchronization controllers 63*r*, 63*r* is roughly the same as the uniform-speed synchronization controller 63 according to the first embodiment; therefore, a detailed explanation thereof will be omitted. In other words, the uniform-speed synchronization controllers 63*r*, 63*r* differ from the uniform-speed synchronization controller 63 according to the first embodiment in the point of establishing the speed difference between the left-front wheel speed and right-front wheel speed, and the speed difference between the left-rear wheel speed and right-rear wheel speed respectively as inputs.

The front-side load balance processor 62*f* generates the left-front wheel load balance correction input Ffil_fl for the left-front wheel dynamometer, and the right-front wheel load balance correction input Ffil_fr for the right-front wheel dynamometer, in accordance with the sequence explained while referencing FIG. 7 below, based on the left-front wheel drive force Fvfl and right-front wheel drive force Fvfr estimated by the drive force observers 61*fl*, 61*fr*.

Figure 7:
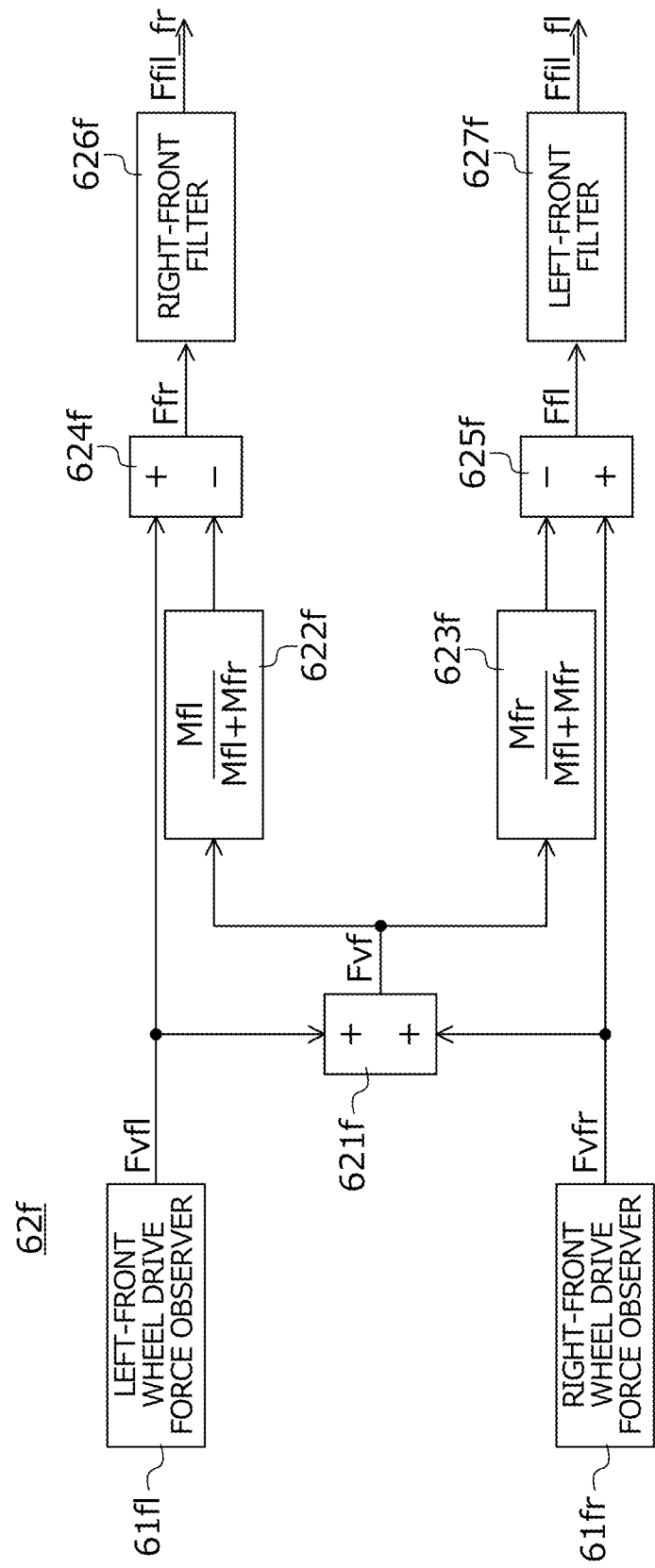
FIG. 7 is a view for explaining a sequence of generating a left front wheel and right front wheel load balance correction input in a forward load balance processor.

FIG. 7 is a view for explaining a sequence of generating the load balance correction inputs Ffil_fl, Ffil_fr in the front-side load balance processor 62*f*.

The front-side load balance processor 62*f* includes a front-side synthetic drive force processor 621*f*, left-front mechanical inertia ratio multiplier 622*f*, right-front mechanical inertia ratio multiplier 623*f*, right-front input processor 624*f*, left-front input processor 625*f*, right-front filter 626*f*, and left-front filter 627*f*.

The front-side synthetic drive force processor 621*f* calculates the front-side synthetic drive force Fvf (N) by adding the left-front wheel drive force Fvfl and right-front wheel drive force Fvfr (Fvf=Fvfl+Fvfr).

The left-front mechanical inertia ratio multiplier 622*f* calculates the left-front correction amount by multiplying the left-front mechanical inertia ratio Cfl determined between 0 and 1 by the forward synthetic drive force Fvf. Herein, the left-front mechanical inertia ratio Cfl is a ratio of the left-front mechanical inertia Mfl relative to the right synthetic mechanical inertia Mfl+Mfr, which is the sum of the left-front mechanical inertia Mfl (kg) combining the left-front wheel roller and the left-front wheel dynamometer, and the right-front mechanical inertia Mfr (kg) combining the right-front wheel roller and the right-front wheel dynamometer (Cfl=Mfl/(Mfl+Mfr)).

The right-front mechanical inertia ratio multiplier 623*f* calculates the right-front correction amount Fvf·Cfr by multiplying the right-front mechanical inertia ratio Cfr obtained by subtracting the left-front mechanical inertia ratio Cfl from 1 by the front-side synthetic drive force Fvf. Therefore, the sum of the left-front correction amount Fvf·Cfl and the right-front correction amount Fvf·Cfr always becomes the front-side synthetic drive force Fvf. Herein, the right-side mechanical inertia ratio Cfr is a ratio of the right-front mechanical inertia Mfr relative to the front-side synthetic mechanical inertia Mfl+Mfr (Cfr=Mfr/(Mfl+Mfr)).

The right-front input processor 624*f* calculates the right-front wheel load balance correction input Ffr by subtracting the left-front correction amount Fvf·Cfl calculated by the left-front mechanical inertia ratio multiplier 622*f* from the left-front wheel drive force Fvfl (Ffr=Fvfl−Fvf·Cfl).

The left-front input processor 625*f* calculates the left-front wheel load balance correction input Ffl by subtracting the right-front correction amount Fvf·Cfr calculated by the right-front mechanical inertia ratio multiplier 623*f* from the right-front wheel drive force Fvfr (Ffl=Fvfr−Fvf·Cfr).

The left-front filter 626*f* is a low-pass filter that removes noise from the output Ffr of the right-front input processor 624*f* by damping a component larger than a predetermined cutoff frequency from the output Ffr of the right-front input processor 624*f*, and passing a component smaller than this cutoff frequency, and is represented by any transfer function PFfr(s) having a relative order of at least first order. The output Ffil_fr of the right-front filter 626*f* is input to the right-front wheel torque current command generator 64*fr*. Hereinafter, the output Ffr of the right-front input processor 624*f* and the output Ffil_fr of the right-front filter 626*f* represented by the following Formula (4) are both referred to as right-front wheel load balance correction input.

$$Ffil\_fr = PFfr(s) \cdot (Fvfr - (Fvf \cdot Cfr)) \qquad (4)$$

The left-front filter 627*f* is a low-pass filter that removes noise from the output Ffl of the left-front input processor 625*f*, by damping the component larger than a predetermined cutoff frequency from the output Ffl of the left-front input processor 625*f*, and passing the component smaller than this cutoff frequency, and is represented by any transfer function PFfl(s) having a relative order of at least first order. The output Ffil_fl of the left-front filter 627*f* is input to the left-front wheel torque current command generator 64*fl*.

Hereinafter, the output Ffl of the left-front input processor 625*f* and the output Ffil_fl of the left-front filter 627*f* represented by the following Formula (5) are both referred to as left-front wheel load balance correction input.

$$Ffil\_fl = PFfl(s) \cdot (Fvfl - (Fvf \cdot Cfl)) \qquad (5)$$

In the above way, the front-side load balance processor 62*f* independently varies the left-front wheel load balance correction input Ffil_fl and right-front wheel load balance correction input Ffil_fr, and raises the left-front wheel load balance correction input Ffil_fl as the right-front wheel drive force Fvfr increases, and raises the right-front wheel load balance correction input Ffil_fr as the left-front wheel drive force Fvfl increases.

Referring back to FIG. 6, the rear-side load balance processor 62*r* generates the left-rear wheel load balance correction input Ffil_rl for the left-rear wheel dynamometer and the front-rear wheel load balance correction input Ffil_rr for the right-rear wheel dynamometer, based on the left-rear drive force Fvrl and right-rear drive force Fvrr estimated by the drive force observers 61*rl*, 61*rr*. It should be noted that, in the rear-side load balance processor 62*r*, for the specific sequence of generating the load balance correction inputs Ffil_rl, Ffil_rr, due to being roughly the same as the sequence of generating the load balance correction inputs Ffil_fl, Ffil_fr in the front-side load balance processor 62*f*, a detailed explanation thereof will be omitted. In other words, in the operation of the front-side load balance processor 62*f*, the parameter for the left-front wheel side may be replaced with the parameter for the left-rear wheel side, and the parameter for the right-front wheel side may be replaced with the parameter for the right-rear wheel side.

The left-front wheel torque current command generator 64*fl* generates the left-front wheel torque current command signal, based on the main control input Fm, left-front wheel load balance command input Ffil_fl, and front-side synchronization correction input Fdf, and inputs this to the left-front wheel inverter 5*fl*. More specifically, the left-front wheel torque current command generator 64*fl* generates a left-front wheel torque current command signal, by subtracting the front-side synchronization correction input Fdf from the sum of the main control input Fm and left-front wheel load balance correction input Ffil_fl.

The right-front wheel torque current command generator 64*fr* generates the right-front wheel torque current command signal, based on the main control input Fm, right-front wheel load balance correction input Ffil_fr, and front-side synchronization correction input Fdf, and inputs this to the right-front wheel inverter 5*fr*. More specifically, the right-front wheel torque current command generator 64*fr* generates the right-front wheel torque current command signal, by adding the main control input Fm, right-front wheel load balance correction input Ffil_fr, and front-side synchronization correction input Fdf.

The left-rear wheel torque current command generator 64*rl* generates the left-rear wheel torque current command signal based on the main control input Fm, left-rear wheel load balance correction input Ffil_rl, and rear-side synchronization correction input Fdr, and inputs this to the left-rear wheel inverter 5*rl*. More specifically, the left-rear wheel torque current command generator 64*rl* generates the left-rear wheel torque current command signal, by subtracting the rear-side synchronization correction input Fdr from the sum of the main control input Fm and the left-rear wheel load balance correction input Ffil_fr.

The right-rear wheel torque current command generator 64*rr* generates and inputs to the right-rear inverter 5*rr* the right-rear wheel torque current command signal, based on the main control input Fm and the right-rear wheel load balance correction input Ffil_rr. More specifically, the right-rear wheel torque current command generator 64*rr* generates the right-rear wheel torque current command signal, by adding the main control input Fm, right-rear wheel load balance correction input Ffil_rr, and rear-side synchronization correction input Fdr.

Third Embodiment

Next, a third embodiment of the present invention will be explained while referencing the drawings. It should be noted that, in the following explanation, the same reference symbols are attached to configurations which are identical to the chassis dynamometer system SA and control device 6A according to the second embodiment, and detailed explanations thereof will be omitted.

Figure 8:
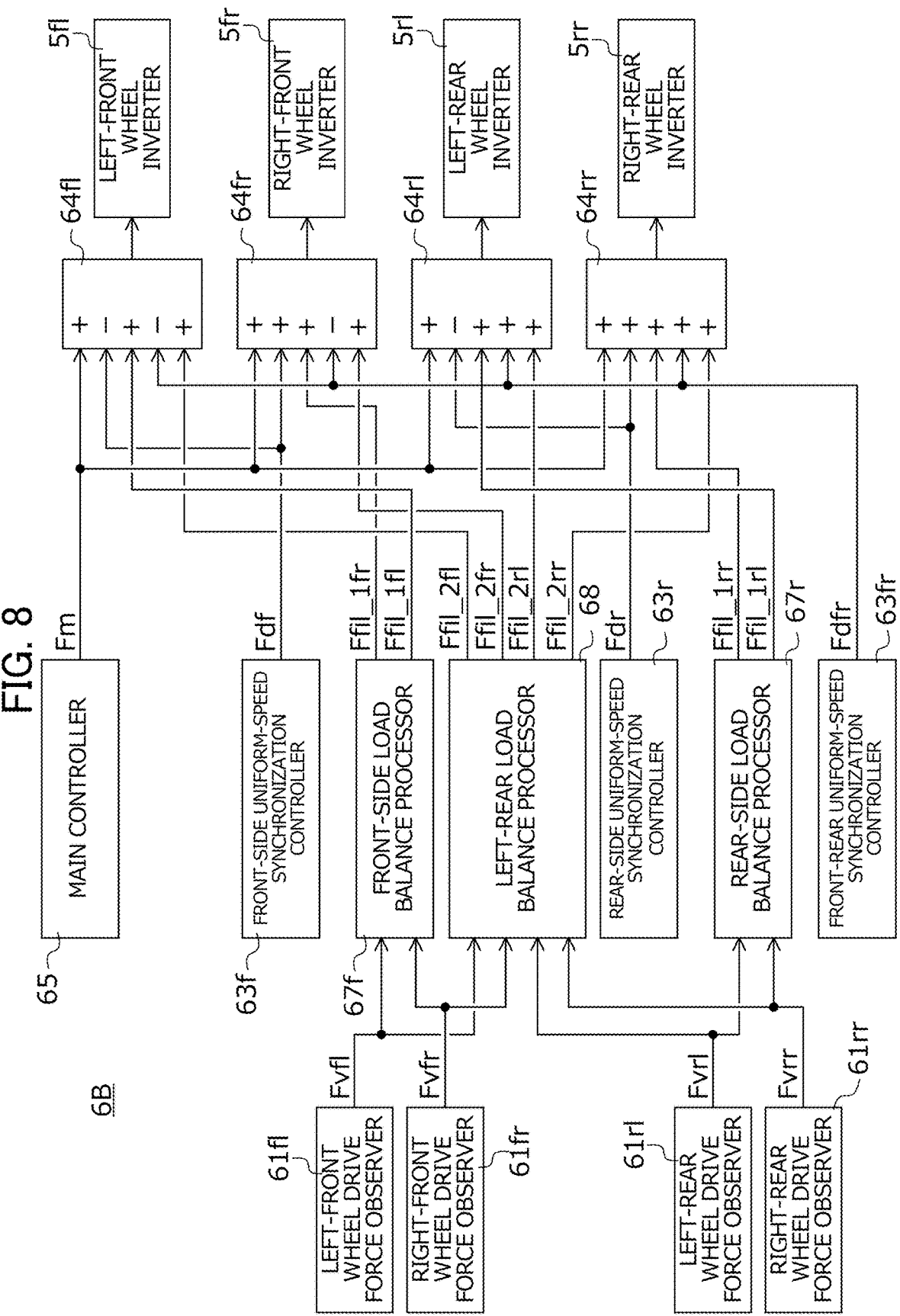
FIG. 8 is a view showing the configuration of a control device of a dynamometer system according to a third embodiment of the present invention.

FIG. 8 is a view showing the configuration of a control device 6B of the dynamometer system according to the present embodiment. The control device 6B includes: a left-front wheel drive force observer 61*fl*, right-front wheel drive force observer 61*fr*, left-rear wheel drive force observer 61*rl*, right-rear wheel drive force observer 61*rr*, front-side load balance processor 67*f*, rear-side load balance processor 67*r*, front-rear load balance processor 68, front-side uniform-speed synchronization controller 63*f*, rear-side uniform-speed synchronization controller 63*r*, front-rear uniform-speed synchronization controller 63*fr*, left-front wheel torque current command generator 64*fl*, right-front wheel torque current command generator 64*fr*, left-rear wheel torque current command generator 64*rl*, right-rear wheel torque current command generator 64*rr*, and main controller 65.

The front-rear uniform-speed synchronization controller 63*fr* generates a front-rear synchronization correction input Fdfr (N) for the left-front wheel, right-front wheel, left-rear wheel and right-rear wheel dynamometers, so that speed difference between the front-side average speed, which is the average of the left-front wheel speed and right-front wheel speed, and the rear-side average speed, which is the average of the left-rear wheel speed and right-rear wheel speed, is eliminated. It should be noted that, in the front-rear uniform-speed synchronization controller 63*fr*, the sequence of generating the front-rear synchronization correction input Fdfr is roughly the same as the uniform-speed synchronization controllers 63*f*, 63*r* according to the second embodiment. In other words, the front-rear uniform-speed synchronization controller 63*fr* differs from the uniform-speed synchronization controllers 63*f*, 63*r* according to the second embodiment in the point of establishing the speed difference between the front-side average speed and rear-side average speed as the input.

The front-side load balance processor 67*f* generates a first left-front wheel load balance correction input Ffil_1*fl* for the left-front wheel dynamometer, and a first right-front wheel load balance correction input Ffil_1*fr* for the right-front wheel dynamometer, based on the left-front wheel drive force Fvfl and the right-front wheel drive force Fvfr estimated by the drive force observers 61*fl*, 61*fr*. It should be noted that, in the front-side load balance processor 67*f*, the sequence of generating the load balance correction inputs Ffil_1*fl*, Ffil_1*fr* is the same as the sequence of generating the load balance correction inputs Ffil_fl, Ffil_fr in the front-side load balance processor 62*f* according to the second embodiment; therefore, a detailed explanation thereof will be omitted.

The rear-side load balance processor 67*r* generates a first left-rear wheel load balance correction input Ffil_1*rl* for the left-rear wheel dynamometer and a first right-rear wheel load balance correction input Ffil_1*rr* for the right-rear wheel dynamometer, based on the left-rear wheel drive force Fvrl and right-rear wheel drive force Fvrr estimated by the drive force observers 61*rl*, 61*rr*. It should be noted that, in the rear-side load balance processor 67*r*, the sequence of generating the load balance correction inputs Ffil_1*rl*, Ffil_1*rr* is the same as the sequence of the generating the load balance correction inputs Ffil_rl, Ffil_rr in the rear-side load balance processor 62*r* according to the second embodiment; therefore, a detailed explanation thereof will be omitted.

Figure 9:
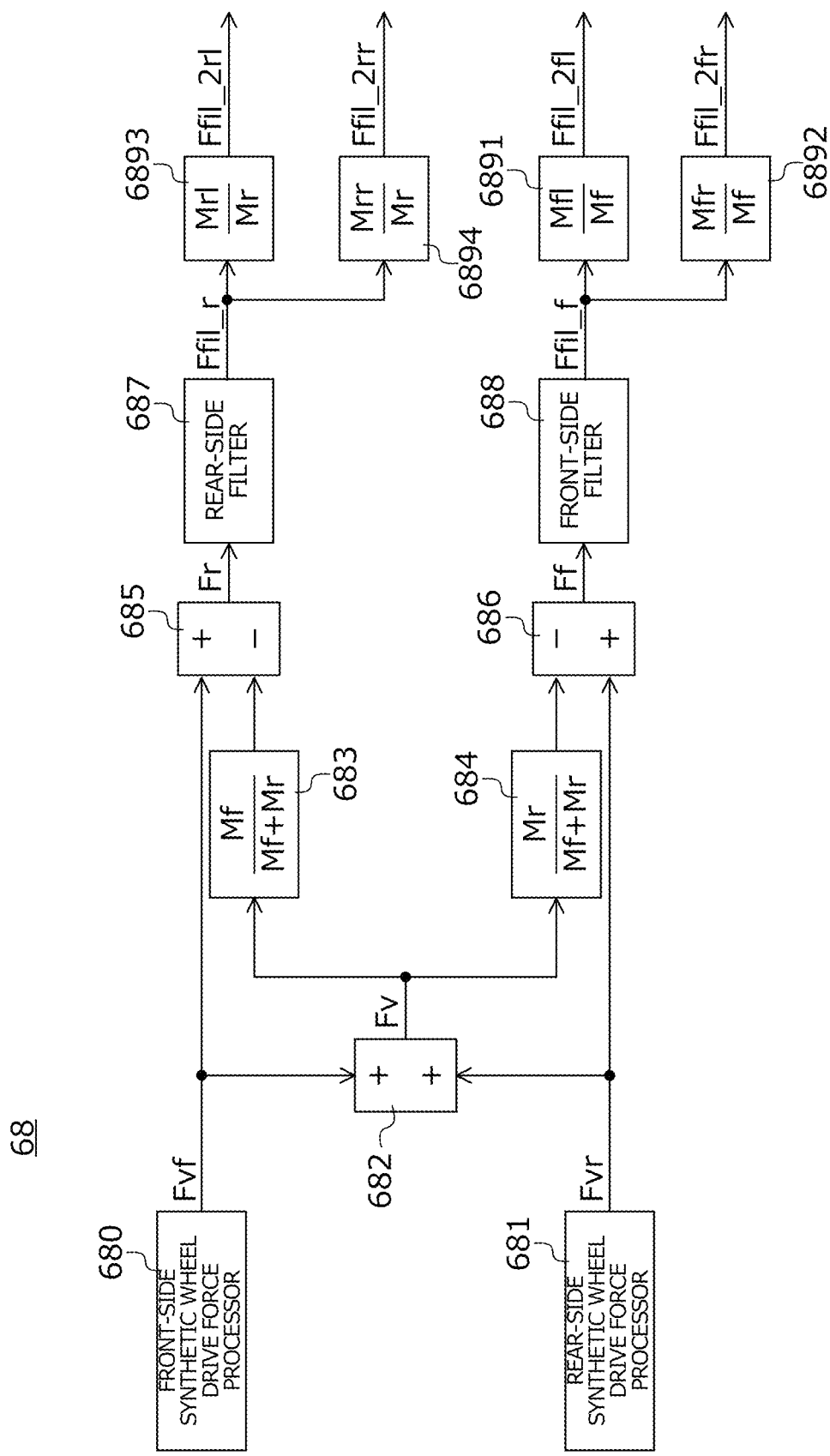
FIG. 9 is a view for explaining a sequence of generating a second left front wheel, second right front wheel, second left rear wheel and second right rear wheel load balance correction input in a front-rear load balance processor.

The front-rear load balance processor 68 generates a second left-front wheel load balance correction input Ffil_2*fl* for the left-front wheel dynamometer, a second right-front wheel load balance correction input Ffil_2*fr* for the right-front wheel dynamometer, a second left-rear wheel load balance correction input Ffil_2*rl* for the left-rear wheel dynamometer, and a second right-rear wheel load balance correction input Ffil_2*rr* for the right-rear wheel dynamometer, following the sequence explained below while referencing FIG. 9, based on the drive forces Fvfl, Fvfr, Fvrl, Fvrr estimated by the drive force observers 61*fl*, 61*fr*, 61*rl*, 61*rr*.

FIG. 9 is a view for explaining a sequence of generating the load balance correction inputs Ffil_frfl, Ffil_frfr, Ffil_frrl, Ffil_frrr in the front-rear load balance processor 68.

The front-rear load balance processor 68 includes: a front-side synthetic drive force processor 680, rear-side synthetic drive force processor 681, synthetic drive force processor 682, front-side mechanical inertia ratio multiplier 683, rear-side mechanical inertia ratio multiplier 684, rear-side input multiplier 685, front-side input multiplier 686, rear-side filter 687, front-side filter 688, left-front mechanical inertia ratio multiplier 6891, right-front mechanical inertia ratio multiplier 6892, left-rear mechanical inertia ratio multiplier 6893 and right-rear mechanical inertia ratio multiplier 6894.

The front-side synthetic drive force processor 680 calculates the front-side synthetic drive force Fvf (N) by adding the left-side wheel drive force Fvfl and the right-front wheel drive force Fvfr (Fvf=Fvfl+Fvfr).

The rear-side synthetic drive force processor 681 calculates the rear-side synthetic drive force Fvr (N) by adding the left-rear wheel drive force Fvrl and right-rear wheel drive force Fvrr (Fvr=Fvrl+Fvrr).

The synthetic drive force processor 682 calculates the synthetic drive force Fv (N) by adding the front-side synthetic drive force Fvf and the rear-side synthetic drive force Fvr (Fv=Fvf+Fvr).

The front-side mechanical inertia ratio multiplier 683 calculates the front-side correction amount Fv·Cf by multiplying the front-side mechanical inertia ratio Cf determined between 0 and 1 by the synthetic drive force Fv. Herein, the front-side mechanical inertia ratio Cf is a ratio of the front-side mechanical inertia Mf relative to the synthetic mechanical inertia Mf+Mr, which is the sum of the front-side mechanical inertia Mf (kg) combining the left-front wheel roller, right-front wheel roller, left-front wheel dynamometer and right-front wheel dynamometer, and the rear-side mechanical inertia Mr (kg) combining the left-rear wheel roller, right-rear wheel roller, left-rear wheel dynamometer and right-rear wheel dynamometer (Cf=Mf/(Mf+Mr)).

The rear-side mechanical inertia ratio multiplier 684 calculates the rear-side correction amount Fv·Cr by multiplying the rear-side mechanical inertia ratio Cr obtained by subtracting the front-side mechanical inertia ratio Cf from 1 by the synthetic drive force Fv. Therefore, the sum of the front-side correction amount and the rear-side correction amount always becomes the synthetic drive force Fv. Herein, the rear-side mechanical inertia ratio Cr is a ratio of the rear-side mechanical inertia Mr relative to the synthetic mechanical inertia Mf+Mr (Cr=Mr/(Mf+Mr)).

The rear-side input processor 685 calculates the rear-side load balance correction input Fr by subtracting the front-side correction amount Fv·Cf calculated by the front-side mechanical inertia ratio multiplier 683 from the front-side drive force Fvf (Fr=Fvf−Fv·Cf).

The front-side input processor 686 calculates the front-side load balance correction input Ff by subtracting the rear-side correction amount Fv·Cr calculated by the rear-side mechanical inertia ratio multiplier 684 from the rear-side drive force Fvr (Ff=Fvr−Fv·Cr).

The rear-side filter 687 is a low-pass filter that removes noise from the output Fr of the rear-side input processor 685 by damping a component larger than a predetermined cutoff frequency from the output Fr of the rear-side input processor 685, and passing a component smaller than this cutoff frequency, and is represented by any transfer function PFr(s) having a relative order of at least first order. The output Ffil_r of the rear-side filter 687 represented by the following Formula (6) is input to the left-rear mechanical inertia ratio multiplier 6893 and the right-rear mechanical inertia ratio multiplier 6894.

$$Ffil\_r = PFr(s) \cdot (Fvf - (Fv \cdot Cf)) \qquad (6)$$

The front-side filter 688 is a low-pass filter that removes noise from the output Ff of the front-side input processor 686, by damping a component larger than a predetermined cutoff frequency from the output Ff of the rear-side input processor 686, and passing a component smaller than this cutoff frequency, and is represented by any transfer function PFf(s) having a relative order of at least first order. The output Ffil_f of the rear-side filter 688 represented by the following Formula (7) is input to the left-rear mechanical inertia ratio multiplier 6891 and the right-rear mechanical inertia ratio multiplier 6892.

$$Ffil\_f = PFf(s) \cdot (Fvr - (Fv \cdot Cf)) \qquad (3)$$

The left-front mechanical inertia multiplier 6891 calculates a second left-front wheel load balance correction input Ffil_2*fl* by multiplying a left-front mechanical inertia ratio Cfl determined between 0 and 1 by the output Ffil_f of the front-side filter 688. Herein, the left-side mechanical inertia ratio Cfl is a ratio of the left-front mechanical inertia Mfl combining the left-front wheel roller and left-front wheel dynamometer relative to the front-side mechanical inertia Mf (Cfl=Mfl/Mf).

The right-front mechanical inertia ratio multiplier 6892 calculates a second right-front wheel load balance correction input Ffil_2*fr* by multiplying the right-front mechanical inertia ratio Cfr obtained by subtracting the left-front mechanical inertia ratio Cfl from 1 by the output Ffil_f of the front-side filter 688. Therefore, the sum of the second left-front wheel load balance correction input Ffil_2*fl* and the second right-front wheel load balance correction input Ffil_2*fr* always becomes the output Ffil_f of the front-side filter 688. Herein, the right-front mechanical inertia ratio Cfr is a ratio of the right-front mechanical inertia Mfr combining the right-front wheel roller and right-front wheel dynamometer relative to the front-side mechanical inertial Mf (Cfr=Mfr/Mf).

The left-rear mechanical inertia ratio multiplier 6893 calculates a second left-rear wheel load balance correction input Ffil_2*rl* by multiplying the left-rear mechanical inertia ratio Crl determined between 0 and 1 by the output Ffil_r of the rear-side filter 687. Herein, the left-rear mechanical inertia ratio Crl is a ratio of the left-rear mechanical inertia Mrl combining the left-rear wheel roller and left-rear wheel dynamometer relative to the rear-side mechanical inertia Mr (Crl=Mrl/Mr).

The right-rear mechanical inertia ratio multiplier 6894 calculates a second right-rear wheel load balance correction input Fil_2*rr* by multiplying the right-rear mechanical inertia ratio Crr obtained by subtracting the left-rear mechanical inertia ratio Crl from 1 by the output Ffil_r of the rear-side filter 687. Therefore, the sum of the second left-rear wheel load balance correction input Ffil_2*rl* and the second right-rear wheel load balance correction input Ffil_2*rr* always becomes the output Ffil_r of the rear-side filter 687. Herein, the right-rear mechanical inertia ratio Crr is a ratio of the right-rear mechanical inertia Mrr combining the right-rear wheel roller and right-rear wheel dynamometer relative to the rear-side mechanical inertia Mr (Crr=Mrr/Mr).

In the above way, the front-rear load balance processor 68 independently varies the second left-front wheel load balance correction input Ffil_2*fl*, second right-front wheel load balance correction input Ffil_2*fr*, second left-rear wheel load balance correction input Ffil_2*rl* and second right-rear wheel load balance correction input Ffil_2*rr*, and raises the second left-front wheel load balance correction input Ffil_2*fl* and second right-front wheel load balance correction input Ffil_2*fr* as the rear-side synthetic drive force Fvr increases, and raises the second left-rear wheel load balance correction input Ffil_2*rl* and second right-rear wheel load balance correction input Ffil_2*rr* as the front-side synthetic drive force Fvf increases.

Referring back to FIG. 8, the left-front wheel torque current command generator 64*fl* generates the left-front wheel torque current command signal based on the main control input Fm, first left-front wheel:load balance correction input Ffil_1*fl*, second left-front wheel load balance correction input Ffil_2*fl*, front-side synthetic correction input Fdf and front-rear synchronization correction input Fdfr, and inputs this to the left-front wheel inverter 5*fl*. More specifically, the left-front wheel torque current command generator 64*fl* generates the left-front wheel torque current command signal, by subtracting the sum of the front-side synchronization correction input Fdr and front-rear synchronization correction input Fdfr, from the sum of the main control input Fm, first left-front wheel load balance correction input Ffil_1*fl* and second left-front wheel load balance correction input Ffil_2*fl*.

The right-front wheel torque current command generator 64*fr* generates the right-front wheel torque current command signal, based on the main control input Fm, first right-front wheel load balance correction input Ffil_1*fr* and second right-front wheel load balance correction input Ffil_2*fr*, and inputs this to the right-front wheel inverter 5*fr*. More specifically, the right-front wheel torque current command generator 64*fr* generates the right-front wheel torque current command signal, by subtracting the front-rear synchronization correction input Fdfr, from the sum of the main control input Fm, first right-front wheel load balance correction input Ffil_1*fr* and second right-front wheel load balance correction input Ffil_2*fr*.

The left-rear wheel torque current command generator 64*rl* generates the left-rear wheel torque current command signal, based on the main control input Fm, first left-rear wheel load balance correction input Ffil_1*rl* and second left-rear wheel load balance correction input Ffil_2*rl*, and inputs this to the left-rear wheel inverter 5*rl*. More specifically, the left-rear wheel torque current command generator 64*rl* generates the left-rear wheel torque current command signal, by subtracting the rear-side synchronization correction input Fdr, from the sum of the main control input Fm, first left-rear wheel load balance correction input Ffil_1*rl* and left-rear wheel load balance correction input Ffil_2*rl*.

The right-rear wheel torque current command generator 64*rr* generates a right-rear wheel torque current command signal, based on the main control input Fm, first right-rear wheel load balance correction input Ffil_1*rr*, second right-rear wheel load balance correction input Ffil_2*rr*, and rear-side synchronization correction input Fdr, and inputs this to the right-rear wheel inverter 5*rr*. More specifically, the right-rear wheel torque current command generator 64*rr* generates the right-rear wheel torque current command signal, by adding together the main control input Fm, first right-rear load balance correction input Ffil_1*rr*, second right-rear wheel load balance correction input Ffil_2*rr*, rear-side synchronization correction input Fdr and front-rear synchronization correction input Fdfr.

Although embodiments of the present invention have been explained above, the present invention is not to be limited thereto. The configurations of detailed parts may be modified as appropriate within the scope of the gist of the present invention.

EXPLANATION OF REFERENCE NUMERALS

V vehicle (vehicle)
Wf front wheel (first wheel)
Wr rear wheel (second wheel)
Wfl left-front wheel
Wfr right-front wheel
Wrl left-rear wheel
Wrr right-rear wheel
S, SA chassis dynamometer system (dynamometer system)
1*f* front-wheel roller (first driven member)
1*r* rear-wheel roller (second driven member)
1*fl* left-front wheel roller (left-front driven member)
1*fr* right-front wheel roller (right-front driven member)
1*rl* left-rear wheel roller (left-rear driven member)
1*rr* right-rear wheel roller (right-rear driven member)
2*f* front wheel dynamometer (first dynamometer)
2*r* rear wheel dynamometer (second dynamometer)
2*fl* left-front wheel dynamometer (left-front dynamometer)
2*fr* right-front wheel dynamometer (right-front dynamometer)
2*rl* left-rear wheel dynamometer (left-rear dynamometer)
2*rr* right-rear wheel dynamometer (right-rear dynamometer)
3*f* front wheel speed sensor (first speed sensor)

3r rear wheel speed sensor (second speed sensor)
3fl left-front wheel speed sensor (left-front speed sensor)
3fr right-front wheel speed sensor (right-front speed sensor)
3rl left-rear wheel speed sensor (left-rear speed sensor)
3rr right-rear wheel speed sensor (right-rear speed sensor)
6, 6A, 6B control device
61f front-wheel drive force observer (first drive force estimation part)
61r rear-wheel drive force observer (second drive force estimation part)
61fl left-front wheel drive force observer (left-front drive force estimation part)
61fr right-front wheel drive force observer (right-front drive force estimation part)
61rl left-rear wheel drive force observer (left-rear drive force estimation part)
61rr right-rear wheel drive force observer (right-rear drive force estimation part)
62 load balance processor
62f, 67f front-side load balance processor
62r, 67r rear-side load balance processor
63 uniform-speed synchronization controller
63f front-side uniform-speed synchronization controller
63r rear-side constant speed synchronization controller
63fr front-rear constant speed synchronization controller
64f front-wheel torque current command generator (first torque current command generator)
64r rear-wheel torque current command generator (second torque current command generator)
64fl left-front wheel torque current command generator (left-front torque current command generator)
64fr right-front wheel torque current command generator (right-front torque current command generator)
64rl left-rear wheel torque current command generator (left-rear torque current command generator)
64rr right-rear wheel torque current command generator (right-rear torque current command generator)
65 main controller
68 front-rear load balance processor

The invention claimed is:

1. A chassis dynamometer system for a vehicle with a first wheel and a second wheel, the chassis dynamometer system comprising:
a first driven member and a second driven member on which the first wheel and the second wheel are respectively placed, and driven by rotation of each;
a first dynamometer and a second dynamometer respectively coupled to the first driven member and the second driven member;
a first speed sensor which detects a first speed of the first dynamometer;
a second speed sensor which detects a second speed of the second dynamometer; and
a control device configured to generate a first torque current command for the first dynamometer and a second torque current command for the second dynamometer based on outputs of the first and second speed sensors, wherein the control device includes:
an uniform-speed synchronization controller configured to generate a synchronization correction input for the first dynamometer and the second dynamometer so that a speed difference between the first speed and the second speed is eliminated;
a first drive force estimator configured to estimate a first drive force transferred from the first wheel to the first driven member;
a second drive force estimator configured to estimate a second drive force transferred from the second wheel to the second driven member;
a load balance processor configured to generate a first load balance correction input for the first dynamometer, and a second load balance correction input for the second dynamometer, based on the first drive force and the second drive force;
a first torque current command generator configured to generate and input to the first dynamometer the first torque current command based on the first load balance correction input and the synchronization correction input; and
a second torque current command generator configured to generate and input to the second dynamometer the second torque current command based on the second load balance correction input and the synchronization correction input,
wherein the load balance processor independently varies the first load balance correction input and the second load balance correction input, and raises the first load balance correction input as the second drive force increases, and raises the second load balance correction input as the first drive force increases.

2. The chassis dynamometer system according to claim 1, wherein the load balance processor:
calculates a first correction amount by multiplying a first ratio determined between 0 and 1 by a synthetic drive force obtained by summing the first drive force and second drive force, and generates the second load balance correction input by subtracting the first correction amount from the first drive force, and
calculates a second correction amount by multiplying a second ratio obtained by subtracting the first ratio from 1 by the synthetic drive force, and generates the first load balance correction input by subtracting the second correction amount from the second drive force.

3. The chassis dynamometer system according to claim 2, wherein the first ratio is a ratio of a first mechanical inertia combining the first driven member and the first dynamometer relative to a synthetic mechanical inertia combining the first driven member, the second driven member, the first dynamometer and the second dynamometer, and
wherein the second ratio is a ratio of a second mechanical inertia combining the second driven member and the second dynamometer relative to the synthetic mechanical inertia.

4. The chassis dynamometer system according to claim 1, wherein the control device further includes a main controller configured to generate a main control input based on any of a speed control algorithm, a torque control algorithm and a travel resistance control algorithm,
wherein the first torque current command generator generates the first torque current command, based on the first load balance correction input, the synchronization correction input and the main control input, and
wherein the second torque current command generator generates the second torque current command based on the second load balance correction input, the synchronization correction input and the main control input.

5. The chassis dynamometer system according to claim 1, wherein the first wheel is a front wheel of the vehicle, and the second wheel is a rear wheel of the vehicle.

6. The chassis dynamometer system according to claim 1, wherein the first wheel is a left wheel of the vehicle, and the second wheel is a right wheel of the vehicle.

7. A chassis dynamometer system for a vehicle with a left-front wheel, a right-front wheel, a left-rear wheel, and a right-rear wheel, the chassis dynamometer system comprising:
- a left-front driven member, right-front driven member, left-rear driven member and right-rear driven member on which the left-front wheel, right-front wheel, left-rear wheel and right-rear wheel are respectively placed, and are driven by rotation of each;
- a left-front dynamometer, right-front dynamometer, left-rear dynamometer and right-rear dynamometer are respectively coupled to the left-front driven member, the right-front driven member, the right-rear driven member and the right-rear driven member;
- a left-front speed sensor which detects a left-front speed of the left-front dynamometer;
- a right-front speed sensor which detects a right-front speed of the right-front dynamometer;
- a left-rear speed sensor which detects a left-rear speed of the left-rear dynamometer;
- a right-rear speed sensor which detects a right-rear speed of the right-rear dynamometer; and
- a control device configured to generate left-front torque current command for the left-front dynamometer, right-front torque current command for the right-front dynamometer, left-rear torque current command for the left-rear dynamometer, and right-rear torque current command for the right-rear dynamometer based on the left-front, right-front, left-rear, and right-rear speed sensors, wherein the control device includes:
  - a front-side uniform-speed synchronization controller configured to generate a front-side synchronization correction input for the left-front dynamometer and the right-front dynamometer so that a speed difference between the left-front speed and the right-front speed is eliminated;
  - a rear-side uniform-speed synchronization controller configured to generate a rear-side synchronization correction input for the left-rear dynamometer and the right-rear dynamometer so that a speed difference between the left-rear speed and the right-rear speed is eliminated;
  - a left-front drive force estimator configured to estimate a left-front drive force transferred from the left-front wheel to the left-front driven member;
  - a right-front drive force estimator configured to estimate a right-front drive force transferred from the right-front wheel to the right-front driven member;
  - a left-rear drive force estimator configured to estimates a left-rear drive force transferred from the left-rear wheel to the left-rear driven member;
  - a right-rear drive force estimator configured to estimate a right-rear drive force transferred from the right-rear wheel to the right-rear driven member;
  - a front-side load balance processor configured to generate a first left-front load balance correction input for the left-front dynamometer and a first right-front load balance correction input for the right-front dynamometer, based on the left-front drive force and the right-front drive force;
  - a rear-side load balance processor configured to generate a first left-rear load balance correction input for the left-rear dynamometer and a first right-rear load balance correction input for the right-rear dynamometer, based on the left-rear drive force and the right-rear drive force;
  - a left-front torque current command generator configured to generate and input to the left-front dynamometer a left-front torque current command based on the first left-front load balance correction input and the front-side synchronization correction input;
  - a right-front torque current command generator configured to generate and input to the right-front dynamometer a right-front torque current command based on the first right-front load balance correction input and the front-side synchronization correction input;
  - a left-rear torque current command generator configured to generate and input to the left-rear dynamometer a left-rear torque current command based on the first left-rear load balance correction input and the rear-side synchronization correction input; and
  - a right-rear torque current command generator configured to generate and inputs to the right-rear dynamometer a right-rear torque current command based on the first right-rear load balance correction input and the rear-side synchronization correction input,
  - wherein the front-side load balance processor independently varies the first left-front load balance correction input and the first right-front load balance correction input, and raises the first left-front load balance correction input as the right-front drive force increases, and raises the first right-front load balance correction input as the left-front drive force increases, and
  - wherein the rear-side load balance processor independently varies the first left-rear load balance correction input and the first right-rear load balance correction input, and raises the first left-rear load balance correction input as the right-rear drive force increases, and raises the first right-rear load balance correction input as the left-rear drive force increases.

8. The chassis dynamometer system according to claim 7, wherein the control device further includes: a front-rear uniform-speed synchronization controller configured to generate a front-rear synchronization correction input for the left-front dynamometer, right-front dynamometer, left-rear dynamometer and right-rear dynamometer so that a speed difference between a front-side average speed which is an average of the left-front speed and the right-front speed, and a rear-side average speed, which is an average of the left-rear speed and the right-rear speed, is eliminated; and
- a front-rear load balance processor configured to generate a second left-front load balance correction input for the left-front dynamometer, a second right-front load balance correction input for the right-front dynamometer, a second left-rear load balance correction input for the left-rear dynamometer, and a second right-rear load balance correction input for the right-rear dynamometer,
- wherein the left-front torque current command generator generates the left-front torque current command based on the first left-front load balance correction input, the second left-front load balance correction input, the front-side synchronization correction input, and the front-rear synchronization correction input,
- wherein the right-front torque current command generator generates the right-front torque current command based on the first right-front load balance correction input, the second right-front load balance correction input, the front-side synchronization correction input, and the front-rear synchronization correction input, wherein the left-rear torque current command generator generates the left-rear torque current command based on the first left-rear load balance correction input, the second left-rear load balance correction input, the rear-side synchronization correction input, and the front-rear synchronization correction input, wherein the right-rear torque current command generator generates the right-rear torque current command based on the first right-rear load balance correction input, the second right-rear load balance correction input, the rear-side synchronization correction input, and the front-rear synchronization correction input, and wherein the front-rear load balance processor independently varies the second left-front load balance correction input, the second right-front load balance correction input, the second left-rear load balance correction input and the second right-rear load balance correction input, and raises the second left-front load balance correction input and the second right-front load balance correction input, as a rear-side synthetic drive force obtained by summing the left-rear drive force and the right-rear drive force increases, and raises the second left-rear load balance correction input and the second right-rear load balance correction input as a front-side synthetic drive force obtained by summing the left-front drive force and the right-front drive force increases.

9. The chassis dynamometer system according to claim 8, wherein the front-rear load balance processor:

calculates a front-side correction amount by multiplying a front-side ratio determined between 0 and 1 by the front-side synthetic drive force, and generates the second left-rear load balance correction input and the second right-rear load balance correction input by subtracting the front-side correction amount from the front-side synthetic drive force, and calculates a rear-side correction amount by multiplying a rear-side ratio obtained by subtracting the front-side ratio from 1 by the rear-side synthetic drive force, and generates the second left-front load balance correction input and second right-front load balance correction input by subtracting the rear-side correction amount from the rear-side synthetic drive force.

10. The chassis dynamometer system according to claim 9, wherein the front-rear load balance processor:

generates the second left-front load balance correction input by multiplying a left-front ratio determined between 0 and 1 by a drive force obtained by subtracting the rear-side correction amount from the rear-side synthetic drive force, generates the second right-front load balance correction input by multiplying a right-front ratio obtained by subtracting the left-front ratio from 1 by a drive force obtained by subtracting the rear-side correction amount from the rear-side synthetic drive force, generates the second left-rear load balance correction input by multiplying a left-rear ratio determined between 0 and 1 by a drive force obtained by subtracting the front-side correction amount from the front-side synthetic drive force, and generates the second right-rear load balance correction input by multiplying a right-rear ratio obtained by subtracting the left-rear ratio from 1 by a drive force obtained by subtracting the front-side correction amount from the front-side synthetic drive force.

* * * * *